(12) United States Patent
Nagao

(10) Patent No.: US 7,480,905 B2
(45) Date of Patent: Jan. 20, 2009

(54) INTERFACE DEVICE, AND METHOD AND COMPUTER READABLE PRODUCT FOR UPDATING FIRMWARE IN THE INTERFACE DEVICE

(75) Inventor: Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 559 days.

(21) Appl. No.: 10/335,862

(22) Filed: Jan. 3, 2003

(65) Prior Publication Data

US 2003/0226137 A1 Dec. 4, 2003

(30) Foreign Application Priority Data

May 29, 2002 (JP) .............................. 2002-156522

(51) Int. Cl.
*G06F 9/44* (2006.01)
(52) U.S. Cl. ........................ 717/171; 717/169; 710/62; 710/73
(58) Field of Classification Search ................. 717/167, 717/171, 168; 713/100; 710/1, 73
See application file for complete search history.

(56) References Cited

U.S. PATENT DOCUMENTS

| | | | | |
|---|---|---|---|---|
| 5,572,683 A * | 11/1996 | Epolite et al. | ................ | 710/104 |
| 5,596,738 A * | 1/1997 | Pope | ........................... | 711/103 |
| 5,623,604 A * | 4/1997 | Russell et al. | ................ | 717/167 |
| 6,237,054 B1 * | 5/2001 | Freitag, Jr. | .................... | 710/72 |
| 6,263,392 B1 * | 7/2001 | McCauley | ................... | 710/305 |
| 6,289,397 B1 * | 9/2001 | Tsuyuguchi et al. | ............ | 710/1 |
| 6,360,362 B1 * | 3/2002 | Fichtner et al. | .............. | 717/168 |
| 6,560,665 B1 * | 5/2003 | Resler et al. | ................. | 710/305 |
| 6,577,229 B1 * | 6/2003 | Bonneau et al. | ........... | 340/10.41 |
| 6,671,756 B1 * | 12/2003 | Thomas et al. | ................. | 710/73 |
| 6,725,260 B1 * | 4/2004 | Philyaw | ...................... | 709/220 |
| 6,725,317 B1 * | 4/2004 | Bouchier et al. | ............. | 710/312 |
| 6,745,325 B1 * | 6/2004 | Gavlik | ........................ | 713/100 |
| 6,990,659 B1 * | 1/2006 | Imai | ............................ | 717/171 |
| 2004/0015952 A1 * | 1/2004 | Lajoie et al. | ................. | 717/171 |

FOREIGN PATENT DOCUMENTS

JP 4-326148 11/1992

OTHER PUBLICATIONS

Japanese Patent Office Action, mailed Nov. 27, 2007 and issued in corresponding Japanese Patent Application No. 2002-156522.

* cited by examiner

*Primary Examiner*—Tuan Q Dam
*Assistant Examiner*—Thuy Dao
(74) *Attorney, Agent, or Firm*—Staas & Halsey LLP

(57) ABSTRACT

The present invention is to provide a KVM device that can perform emulation with any type of device. In this KVM device, firmware for performing a suitable operation for a connected device (KVM) is stored in a memory. The connected device is inspected, and suitable firmware for the device is selected and then installed. The firmware stored in the memory can be rewritten freely. More specifically, the memory is formed by a non-volatile memory so that firmware inputted through an external interface can be stored therein. Thus, the KVM device of the present invention can always cope with the latest type of device.

20 Claims, 20 Drawing Sheets

INTERFACE DEVICE, AND METHOD AND COMPUTER READABLE PRODUCT FOR UPDATING FIRMWARE IN THE INTERFACE DEVICE

BACKGROUND OF THE INVENTION

1. Field of the Invention

The present invention generally relates an interface device, and a method and a computer readable product for updating firmware in the interface device, and more particularly, to an interface device that enables one device to be shared by a plurality of computers, and a method and a computer readable product for storing program steps of updating firmware in the interface device.

2. Description of the Related Art

A "KVM" (Keyboard, Video, and Mouse) device is well known as an interface device of the above described type. FIG. 1 illustrates a system that employs a conventional KVM device 100.

As shown in FIG. 1, the KVM device 100 enables peripherals, such as a keyboard 21, a mouse 22, and a display 23 (these devices will be hereinafter referred to as the "KVM"), to be shared by a plurality of information processing apparatuses, such as personal computers (hereinafter referred to simply as "PCs") 1 through 4.

More specifically, the KVM device 100 emulates the KVM for the PCs 1 through 4 connected thereto. The PCs 1 through 4 operate in accordance with the KVM emulated by the KVM device 100. In this manner, only one KVM is required by the PCs 1 through 4, which originally require four separate KVMs.

FIG. 2 illustrates the inner structure of the KVM device 100 of FIG. 1.

As can be seen from FIG. 2, a plurality of microcontroller circuits (hereinafter referred to as the "MCUs") 11 through 15 are provided in the KVM device 100, and are connected to one another via an internal bus 19. In this example shown in FIGS. 1 and 2, the PCs 1 through 4 are to be connected to the MCUs 11 through 14 of the KVM device 100 via external interfaces 1a through 4a that serve as connecting interfaces. The keyboard 21, the mouse 22, and the display 23, which constitute the KVM, are to be connected to the MCU 15 via an external interface 5a that is a connecting interface.

The external interfaces 1a through 5a shown in FIG. 2 include interfaces for various types of KVMs shown in FIG. 3. For example, a keyboard interface group 21a includes an industry standard "PS/2" keyboard interface, an industry standard "SUN" keyboard interface, and an industry standard "USB" keyboard interface. A mouse interface group 22a includes an industry standard "PS/2" mouse interface, an industry standard "SUB" mouse interface, and an industry standard "USB" mouse interface. A display interface group 23a includes an analog display interface and a digital display interface.

The MCU 15 to which the KVM is connected via the external interface 5a is provided with switches 16 that enable an operator to operate the KVM device 100. These switches 16 are used to select for which one of the PC 1 through 4 the device (the keyboard 21, the mouse 22, and the display 23 in this case) connected via the external interface 5a is to be activated. Accordingly, an operator operates the switches 16 to switch PCs to be activated.

FIG. 4 illustrates a situation where the KVM connected via the external interface 5a is actively operating for the PC 1, while no data transactions are generated in the MCUs 12 through 14 to be connected to the other PCs 2 through 4. In this situation, just operating the switches 16, an operator can switch the objects for which the KVM actively operates from the PC 1 to the PC 4, as illustrated in FIG. 5.

With the above conventional KVM device 100, however, it is necessary to emulate the situation in which the KVM is actually connected to each PC, and therefore, there are restrictions on what types of KVMs can be employed.

More specifically, to operate an active PC as if it were actually connected to the KVM, the MCU 11 of the KVM device 100 needs to provide an accurately emulated KVM to a device driver stack 1b2 of an operation system (hereinafter referred to simply as the "OS") 1b incorporated into an PC (the PC 1, for example), as illustrated in FIG. 6. In doing so, the MCU 11 of the KVM device 100 estimates the operation of the KVM connected to the external interface 5a, and then determines its own operation for the active PC1 connected to the external interface 1a. The same applies to the other MCUs 2 through 4.

In this case, the KVM to be connected has to be compatible with and recognizable to the KVM device 100.

However, in a case where a KVM unrecognizable to an MCU in the KVM device 100 is connected, there are inconsistencies in the control method between the KVM and the PC, and the KVM functions to materialize for the PC are limited by the MCU, regardless of the original functions of the connected KVM.

As a result, there are such problems that an unrecognizable KVM cannot be recognized, cannot be operated, or does not properly function.

FIG. 7 illustrates a specific example of the above problems.

Examples of widely known keyboard interfaces include an industry standard "PS/2" keyboard interface, an industry standard "SUN" keyboard interface, and an industry standard "USB" keyboard interface.

However, these keyboards are already specified in the industry standard specifications, and most keyboards operate in accordance with the specifications. Accordingly, except for the external interfaces, these keyboards have the same structures each including a keyboard matrix and an LED (Light Emitting Diode).

On the other hand, there exist a number of keyboards that are provided with non-standard functions.

To cope with cases in which non-standard functions are provided for external interfaces, a function to emulate the non-standard functions needs to be incorporated into the KVM device 100, but, being non-standard, these functions cannot always be emulated and incorporated.

For the above reasons, an unrecognizable keyboard having a non-standard function cannot be even activated in the worst case scenario.

SUMMARY OF THE INVENTION

It is therefore an object of the present invention to provide an interface device in which the above disadvantages are eliminated.

A more specific object of the present invention is to provide an interface device that can perform emulation with any type of device.

Another specific object of the present invention is to provide a method and a computer readable product for updating the firmware in the above interface device.

The above objects of the present invention are achieved by an interface device including: a memory in which firmware is stored; an external interface to which a device is connected; and microcontroller units (MCUs) in one of which firmware selected from the memory is installed, the firmware selected suitably for the device connected to the external interface, the memory being able to rewrite the stored firmware. The interface device can emulate any peripheral device with particular limitation. Even if the device to be connected is unknown by the interface device, the interface device can recognize the unknown device as a known device by updating firmware. Thus, there is no particular limitation on the device.

The above objects of the present invention are also achieved by a method of updating firmware in an interface device in which suitable firmware selected from a memory for a device connected to an external interface is installed in a MCU, the method comprising the steps of: recognizing the device connected to the external interface; comparing version information of the firmware corresponding to the recognized device stored in the memory with version information of the firmware installed in the MCU; and updating the firmware installed in the MCU with the firmware stored in the memory, when the version of the firmware installed in the MCU is older than the version of the firmware stored in the memory. It is therefore possible to carry out emulation without any particular limitation on the device to be connected and to automatically update firmware as necessary when the device is connected.

The above objects of the present invention are also achieved by a method of updating firmware in an interface device in which suitable firmware selected from a memory for a device connected to an external interface is installed in a MCU, the method comprising the steps of: detecting an update of firmware stored in the memory; comparing version information of the firmware corresponding to the updated firmware stored in the memory with version information of the firmware installed in the MCU; and updating the firmware installed in the MCU with the firmware stored in the memory, when the version of the firmware installed in the MCU is older than the version of the firmware stored in the memory. It is therefore possible to carry out emulation without any particular limitation on the device to be connected and to automatically update firmware as necessary when the device is connected.

The above-mentioned objects of the present invention are also achieved by a computer readable product that is installed in an interface device in which suitable firmware selected from a memory for a device connected to an external interface is installed in a MCU, the computer readable product being designed for a computer to carry out the steps of: recognizing the device connected to the external interface; comparing version information of the firmware corresponding to the recognized device stored in the memory with version information of the firmware installed in the MCU; and updating the firmware installed in the MCU with the firmware stored in the memory, when the version of the firmware installed in the MCU is older than the version of the firmware stored in the memory. The computer readable product, which may, for example, be a memory acts as a tool for updating the firmware of the interface device.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS (Principles of the Invention)

The present invention is to provide an interface device that can perform emulation with any type of device employed. The interface device according to the present invention can transform an unrecognizable device into a recognizable device by updating the firmware of the device. By doing so, the interface device according to the present invention can cope with any type of device.

To realize this, the interface device according to the present invention selects firmware from a predetermined memory for a device connected to an external interface, and installs the selected firmware in a microcontroller (MCU). The predetermined memory is characteristically able to rewrite the firmware.

The following is a detailed description of preferred embodiments of the present invention characterized as above, with reference to the accompanying drawings.

FIRST EMBODIMENT

First, a first embodiment of the present invention will be described in detail, with reference to the drawings.

(Structure)

Figure 1:
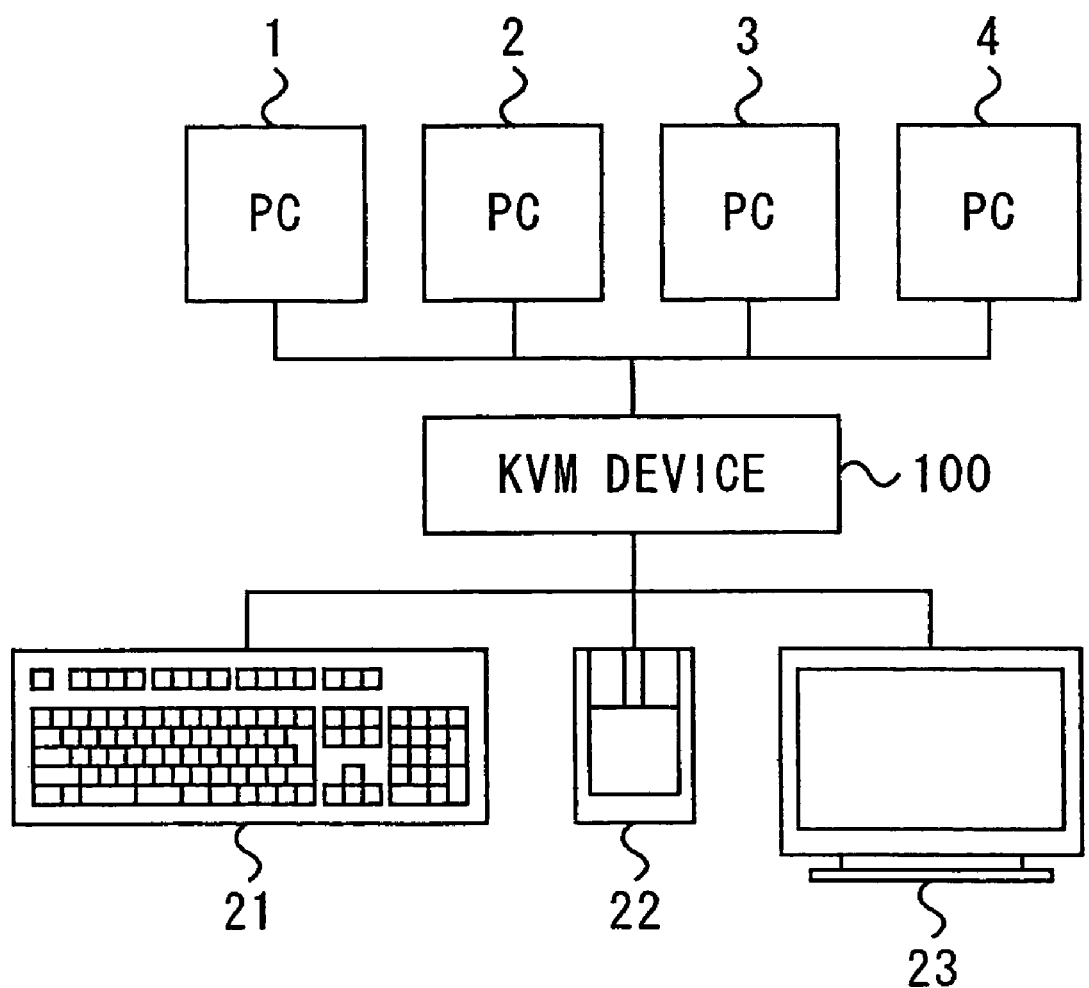
FIG. 1 is a block diagram illustrating a system structure in which a conventional KVM device 100 is employed.
Figure 2:
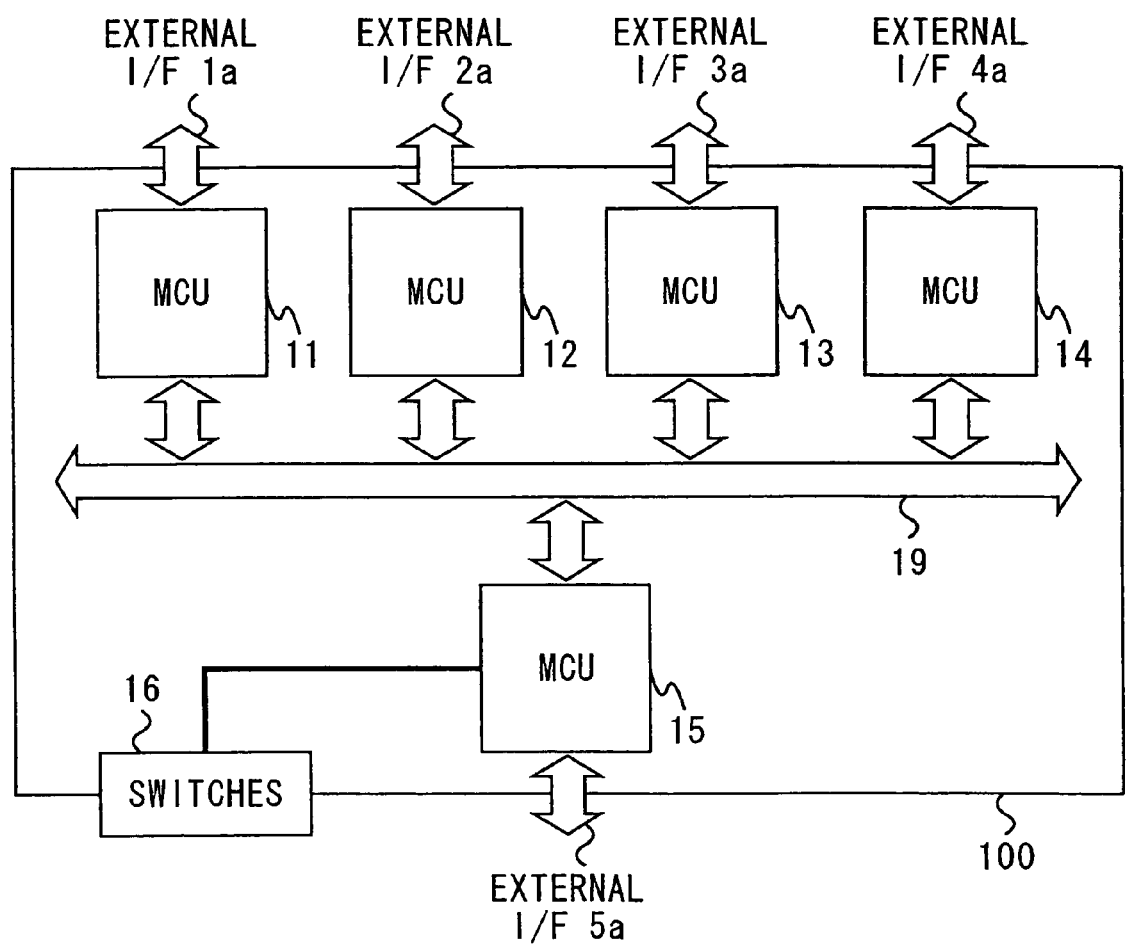
FIG. 2 is a block diagram illustrating the inner structure of the conventional KVM device 100 shown in FIG. 1.
Figure 3:
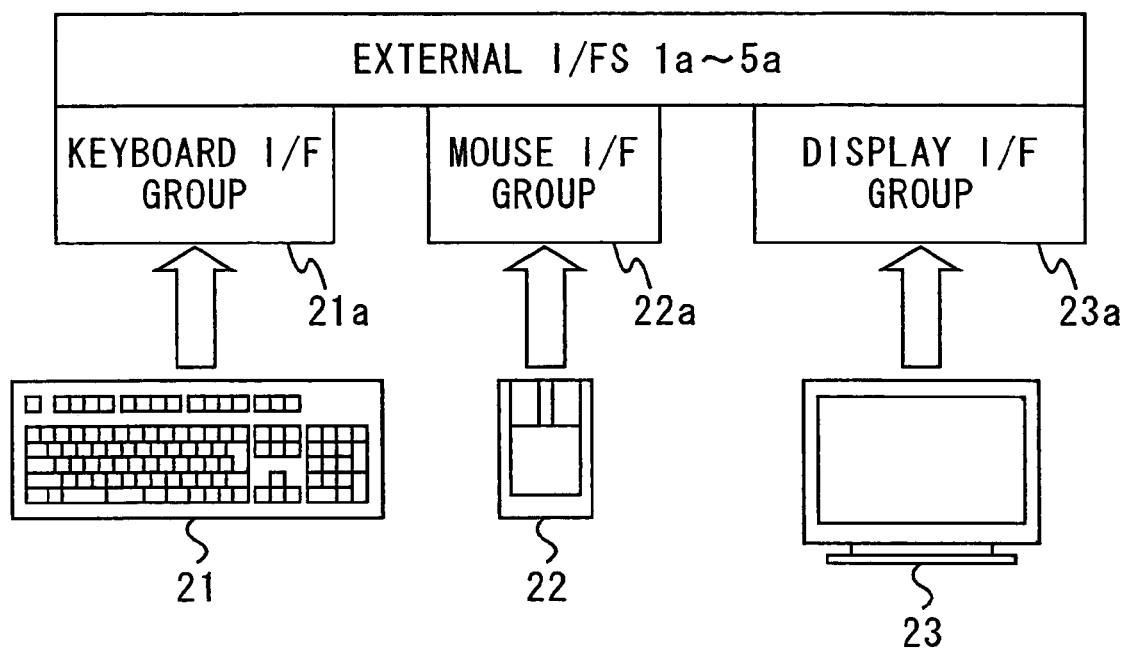
FIG. 3 illustrates a group of interfaces that can be included in the external interfaces 1a through 5a shown in FIG. 2.
Figure 4:
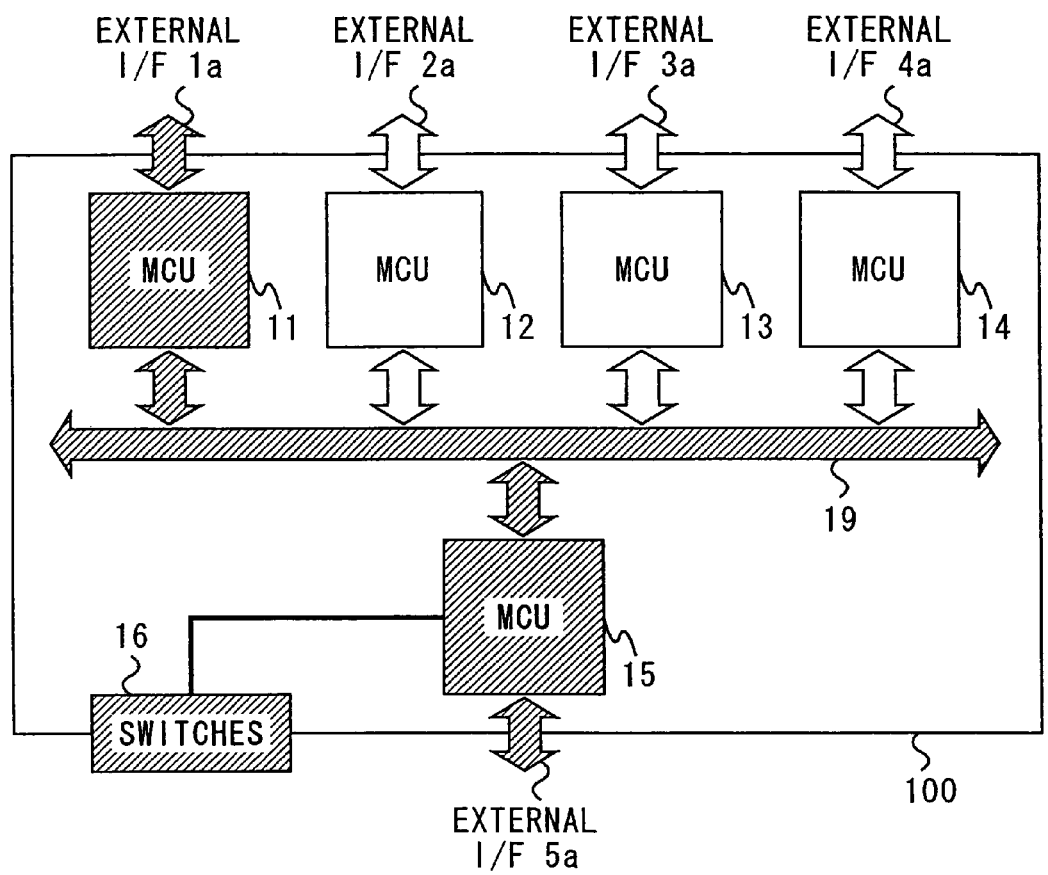
FIG. 4 illustrates an active state of the PC1 in the conventional KVM device 100 shown in FIG. 2.
Figure 5:
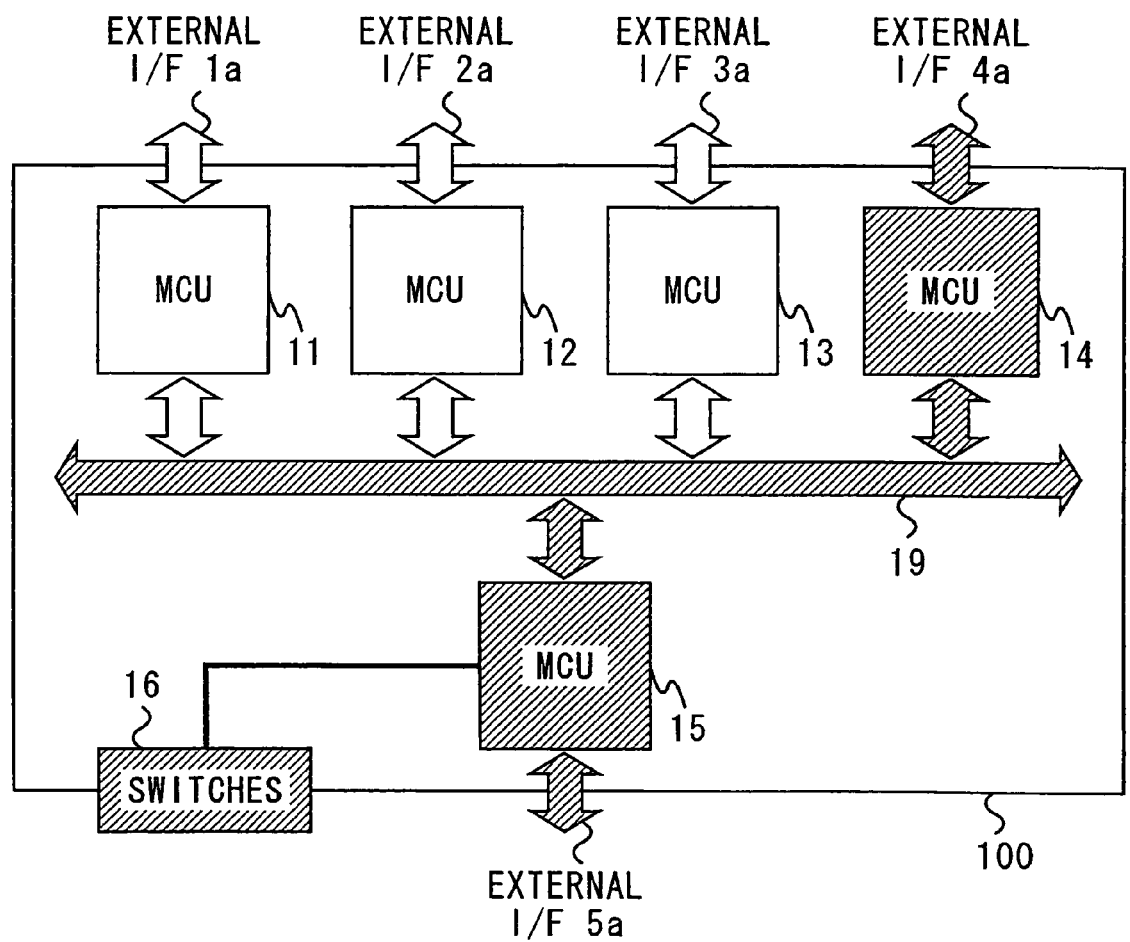
FIG. 5 illustrates the transition of the conventional KVM device 100 from the state shown in FIG. 4 to a state in which the PC 4 is active.
Figure 6:
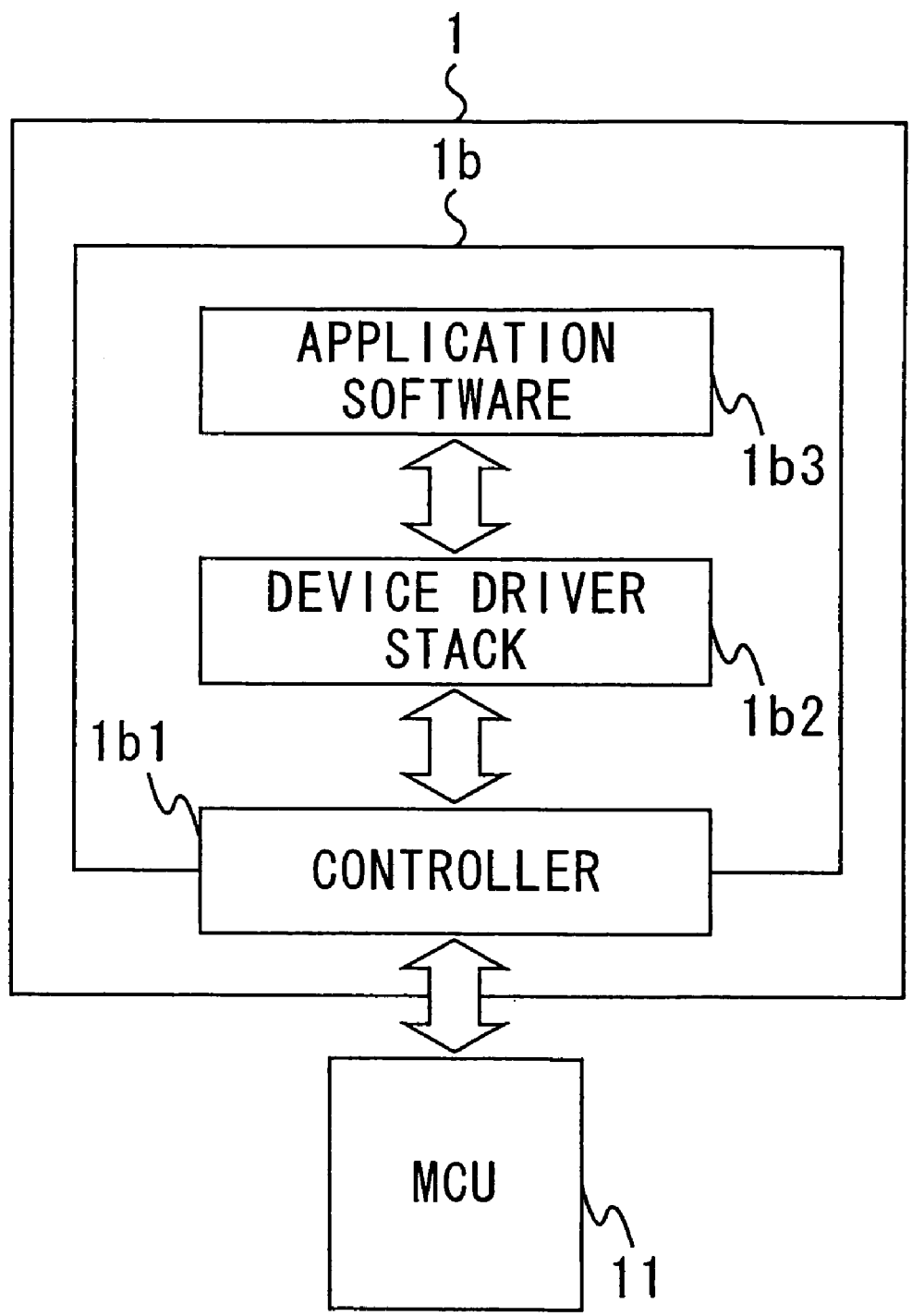
FIG. 6 illustrates the connection between the OS 1b incorporated in the PC 1 and the MCU 11 of the conventional KVM device 100.
Figure 7:
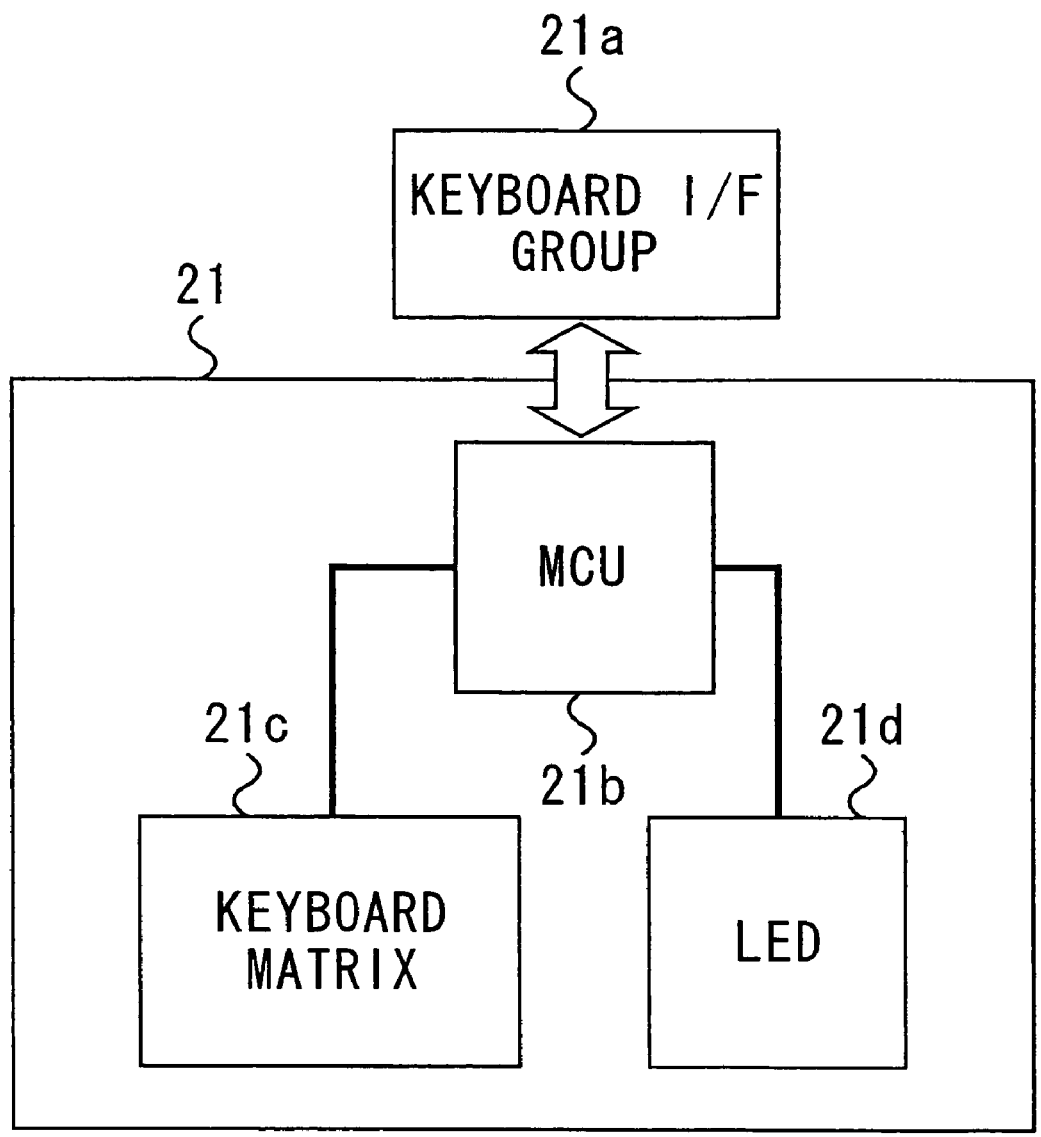
FIG. 7 illustrates the connection between the keyboard 21 of a general structure and a keyboard interface group 21a of the conventional KVM device 100.
Figure 8:
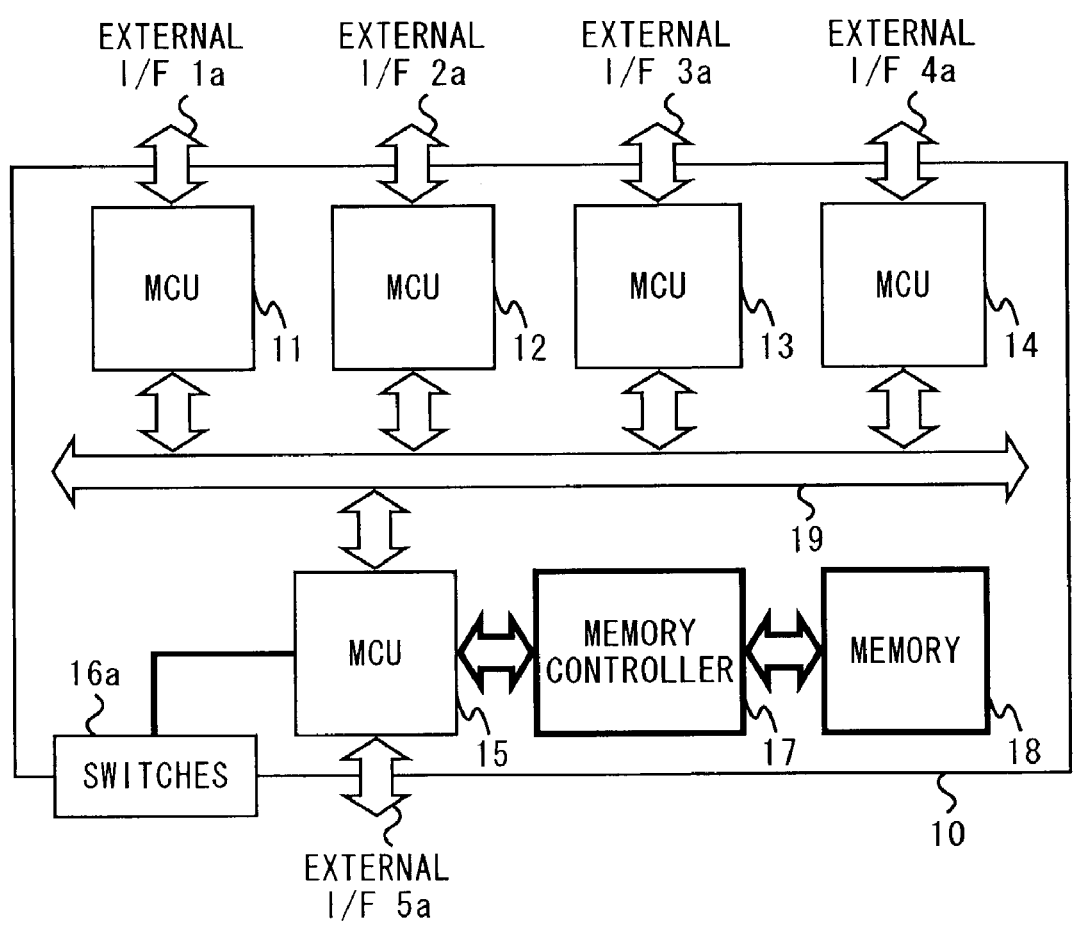
FIG. 8 is a block diagram illustrating the structure of a KVM device 10 according to a first embodiment of the present invention.

FIG. 8 is a block diagram illustrating the structure of a KVM device 10 according to this embodiment.

Referring to FIG. 8, the KVM device 10 includes MCUs 11 through 14 to be connected to PCs 1 through 4 (not shown) via external interfaces 1a through 4a, and an MCU 15 to be connected to a KVM via an external interface 5a, with the MCUs 11 through 15 being connected to one another via an internal bus 19. Switches 16a for switching active connections of the KVM with the PCs are connected directly to the MCU 15. The switches 16a are designed in such a fashion that an operator can operate the switches 16a from the outside of the housing of the KVM device 10. A memory 18 is also connected to the MCU 15 via a memory controller 17.

The memory 18 is a non-volatile memory such as an EPROM (Erasable Programmable ROM) or an EEPROM (Electrically Erasable Programmable ROM). However, as long as power is constantly supplied, a volatile memory, such as a DRAM (Dynamic Random Access Memory) or a SRAM (Static Random Access Memory), can be employed instead of a non-volatile memory. Hereinafter, the memory controller 17 and the memory 18 will be collectively referred to as the "memory unit".

Firmware necessary for all or part of the MCUs installed in the KVM device 10 is stored in the memory unit. This firmware is used for emulating the functions of the KVM for the PCs 1 through 4.

In this embodiment, the firmware stored in the memory 18 can be rewritten via the memory controller 17, an MCU (the MCU 15 in the example shown in FIG. 8), and an external interface (the external interface 5a in the example shown in FIG. 8). In this manner, the firmware stored in the memory 18 is updated by an information processing apparatus connected to the external interface 5a. In the following, the procedures of the firmware updating will be described in detail, with reference to FIG. 9.

Figure 9:
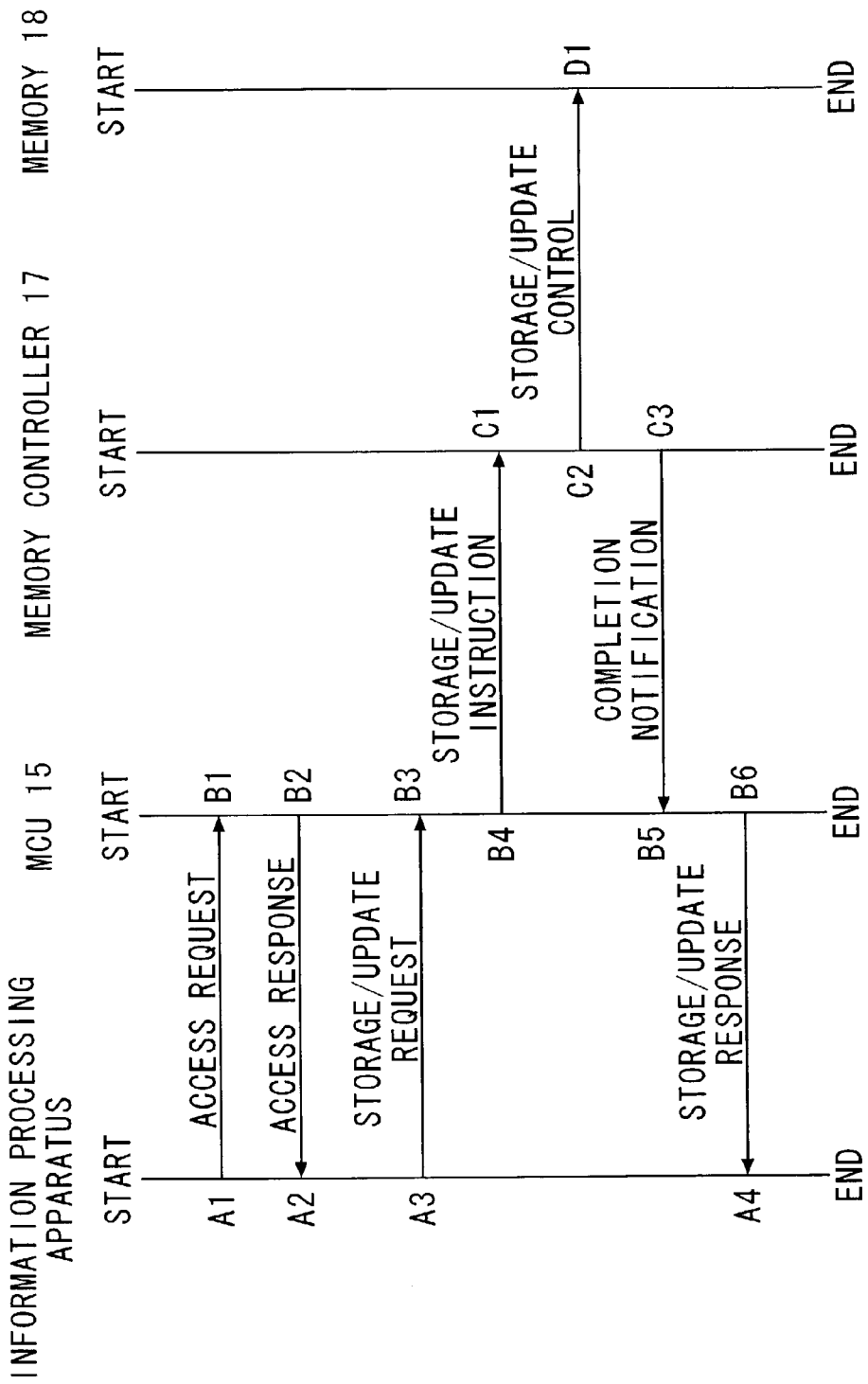
FIG. 9 is a sequence diagram of the procedures for rewriting the firmware stored in the memory 18 of the KVM device 10 shown in FIG. 8.

As shown in FIG. 9, the information processing apparatus connected to the external interface 5a requests for access to the MCU 15 (A1→B1). The MCU 15 responds to the request (B2→A2). After the access from the information processing apparatus to the MCU 15, the information processing apparatus requests the MCU 15 for storage or update of the firmware in the memory 18 (A3→B3). At this point, the firmware to be stored is also inputted into the MCU 15. In response to the storage/update request, the MCU 15 issues an instruction to store or update the firmware in the memory 18, and inputs the instruction and the firmware into the memory controller 17 (B4→C1). In pursuance of the instruction, the memory controller 17 stores the firmware in the memory 18 (C2→D1), and then notifies the MCU 15 of the completion of the storage (C3→B5). Upon receipt of the notification, the MCU 15 inputs a response to the request into an information processing terminal (B6→A4). In this manner, the firmware is stored in the memory 18 or updated in the memory 18 via the external interface 5a, the MCU 15, and the memory controller 17.

The MCUs 11 through 14 each include a non-volatile memory of the above described type, in which the firmware inputted from the MCU 15 is stored. Further, the MCU 15 also includes a non-volatile memory of the above described type, in which the firmware read from the memory 18 is stored. The firmware stored in the non-volatile memory of any of the MCUs 11 through 15 can be rewritten. This rewriting operation will be described later in detail.

As described above, firmware selected from a predetermined memory for the device connected to an external interface is installed in a microcontroller (MCU) in the interface device. The memory in the interface device can be rewritten so as to enable emulation of the corresponding device without restrictions.

(Operation)

Figure 10:
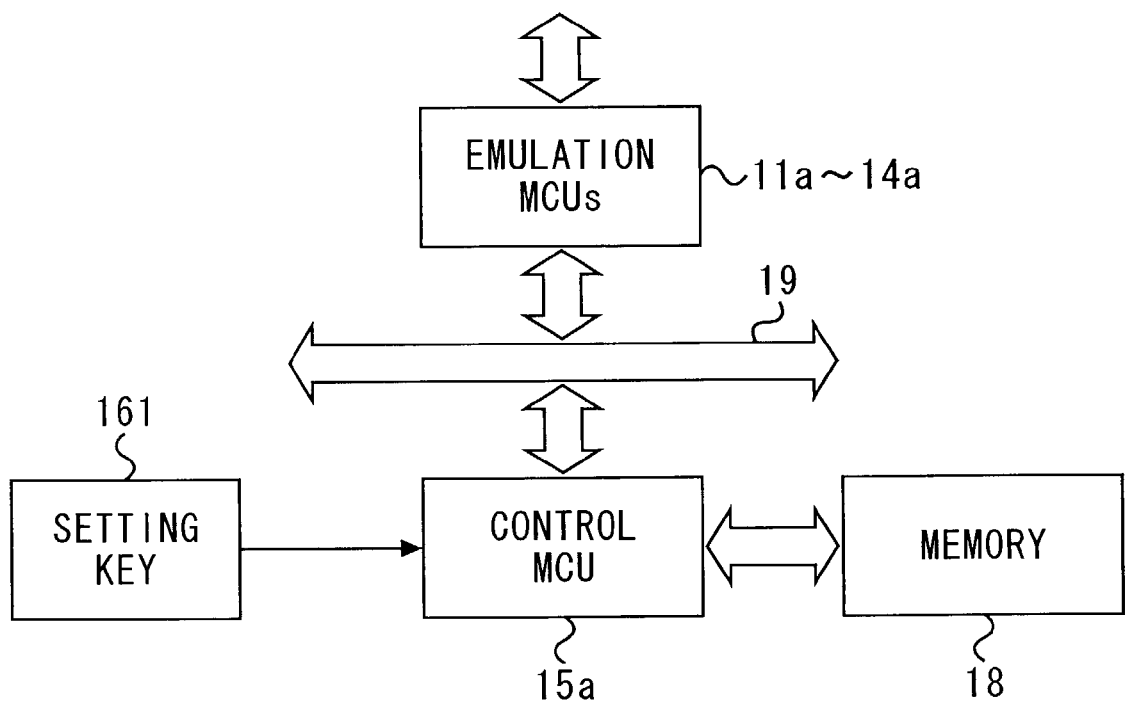
FIG. 10 is a block diagram illustrating the structure of the KVM device 10 in an operation to update the firmware installed in the emulation MCUs 11a through 14a in accordance with the first embodiment of the present invention.
Figure 11:
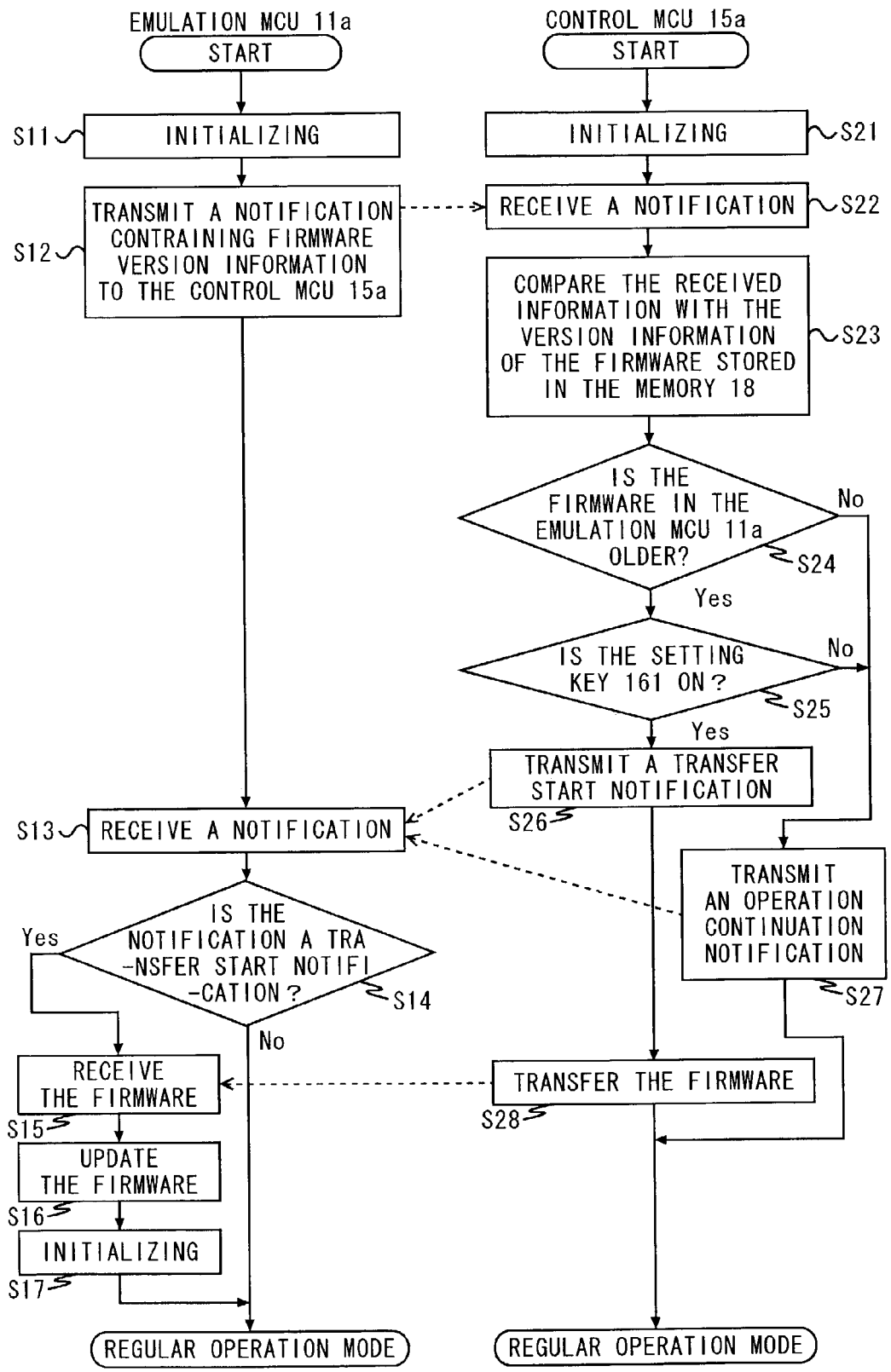
FIG. 11 is a flowchart of an operation to update the firmware installed in the emulation MCUs 11a through 14a in accordance with the first embodiment of the present invention.

Referring now to FIGS. 10 and 11, the updating procedures of the firmware installed in the MCUs 11 through 15 will be described in detail.

FIG. 10 is a block diagram illustrating the structure of the KVM device 10. In this figure, the memory controller 17 is not shown, the MCU 15 is shown as a control MCU 15a, and the MCUs 11 through 14 are shown as emulation MCUs 11a through 14a, for ease of explanation.

FIG. 11 is a flowchart of the operation of updating the firmware stored in the MCUs 11 through 14 of the KVM device 10.

Referring to FIG. 10, the KVM device 10 of this embodiment has the control MCU 15a to be connected to the external interface 5a shown in FIG. 8, and the emulation MCUs 11a through 14a to be connected to the external interfaces 1a through 4a, with the control MCU 15a and the emulation MCUs 11a through 14a being communicative with one another via the internal bus 19. A setting key 161 is connected to the control MCU 15a. This setting key 161 is one of the switches 16a. Accordingly, an operator can freely operate the setting key 161 from the outside of the housing.

In response to a request from the control MCU 15a, the memory 18 performs read and write on the firmware. Although not shown in FIG. 10, there exists the memory controller 17 between the control MCU 15a and the memory 18, so that read and write operations for the memory 18 can be controlled.

In the above structure, the control MCU 15a determines whether the setting key 161 has been pressed or is held in a pressed state at the start of an operation. If the pressing or the pressed state is detected, the control MCU 15a and the emulation MCUs 11a through 14a move on to an operation mode in which the firmware can be updated. If the pressing or the pressed state is not detected, the control MCU 15a and the emulation MCUs 11a through 14a enter a regular operation mode to realize the function of emulating the KVM. In the following, these operations will be descried in greater detail, with reference to FIG. 11. It should be noted that explanation will be made with respect to the emulation MCU 11a in FIG. 11, but the same operation is of course to be performed for the other emulation MCUs 12a through 14a.

Referring to FIG. 11, after the start of an operation, the control MCU 15a and the emulation MCU 11a perform an initializing operation to start the preparation for a main operation in steps S11 and S21. In the initializing operation, the control MCU 15a recognizes the model and type of the KVM connected thereto, and notifies the emulation MCU 11a of the recognized model and type.

The control MCU 15a then receives the version information of the incorporated firmware from the emulation MCU 11a in step S22. The version information includes the information as to the recognized KVM and the corresponding firmware, and is transmitted to the control MCU 15a. Meanwhile, after the initializing operation, the emulation MCU 11a transmits the version information of the firmware incorporated therein to the control MCU 15a in step S12.

After receiving the version information of the firmware incorporated into the emulation MCU 11a, the control MCU 15a spots the version information of the corresponding firmware stored in the memory 18, and compares it with the received version information in step S23. If the version of the firmware stored in the emulation MCU 11a is older ("YES" in step S24), the control MCU 15a determines whether the setting key 161 is ON (having been pressed or held in a pressed state) in step S25. If the setting key 161 is determined not to be ON ("NO" in step S25), the control MCU 15a transmits an operation continuation notification to the emulation MCU 11a in step S27, so as to enter a regular operation mode. After that, the control MCU 15a enters the regular operation mode. Here, the emulation MCU 11a operates along the operation flow described later, but basically moves straight on to the regular operation mode after the initializing operation.

If the setting key 161 is determined to be ON ("YES" in step S25), the control MCU 15a transmits a transfer start notification to the emulation MCU 11a in step S26, so as to transfer firmware of a new version, i.e., the firmware stored in the memory 18, to the emulation MCU 11a. The control MCU 15a then reads the corresponding firmware from the memory 18, and transfers it to the emulation MCU 11a in step S28.

If the version of the firmware stored in the emulated MCU 11a is newer or as old as the firmware stored in the memory 18 ("NO" in step S24), the control MCU 15a transmits an operation continuation notification to the emulation MCU 11a in step S27, so as to enter the regular operation mode. After that, the control MCU 15a enters the regular operation mode.

In the above manner, the emulation MCU 11a receives a transfer start notification or an operation continuation notification in step S13. The emulation MCU 11a then determines whether the received notification is a transfer start notification or an operation continuation notification in step S14. If the received notification is an operation continuation notification ("NO" in step S14), the emulation MCU 11a moves straight on to the regular operation mode, and performs an operation specified by the existing firmware.

If the received notification is a transfer start notification ("YES" in step S14), the emulation MCU 11a receives the firmware transmitted from the control MCU 15a in step S15, and updates the corresponding firmware stored in the nonvolatile memory thereof in step S16. After that, the emulation MCU 11a again performs an initializing operation in step S17, and enters the regular operation mode to perform an operation specified by the newly installed firmware.

By the above operation procedures, the firmware installed in the emulation MCU 11a can be promptly updated. Any structure can be employed as the structure for transmitting various notifications between the control MCU 15a and the emulation MCU 11a. For example, an I²C bus that is a serial input/output (I/O) bus may be employed, so that the control MCU 15a can read in the register of the emulation MCU 11a.

After performing the above operation for all the emulation MCUs (the MCUs 11a through 14a in the example shown in FIG. 8), the control MCU 15a moves on to the regular operation mode in the flowchart of FIG. 11.

To update the firmware of the control MCU 15a, the version information of the firmware installed in the control MCU 15a is compared with the version information of the firmware stored in the memory 18 with respect to the KVM recognized by the control MCU 15a in the initializing operation. If the version of the firmware stored in the memory 18 is newer, the firmware stored in the memory 18 is read out so as to update the firmware of the control MCU 15a.

Alternatively, the control MCU 15a may automatically detect updating of the firmware stored in the memory 18. If the updating is detected, the updated firmware is read out, so that the control MCU 15a can update its own firmware or the firmware installed in any one of the MCU 11a through 14a.

As described so far, this embodiment provides a KVM device that is an interface device for enabling one device to be shared by a plurality of host computers. In this KVM device, the firmware stored in the memory can be promptly rewritten when necessary. In this structure, the MCU connected to the memory controller can rewrite the firmware of another MCU to which the MCU is connected via the internal bus of the KVM device. As a result of this, the function of the MCU in the KVM is modified, and therefore, firmware suitable for the device connected to the MCU to which the memory controller is connected can be selected in this embodiment. In short, the KVM according to this embodiment can cope with any type of device, because firmware suitable for the connected device is selected so as to rewrite the firmware stored in the memory accordingly. Thus, a KVM device that operates in a suitable manner for the connected device can be provided.

SECOND EMBODIMENT

In the following, another example of a KVM device will be described as a second embodiment of the present invention, with reference to a drawing.

Figure 12:
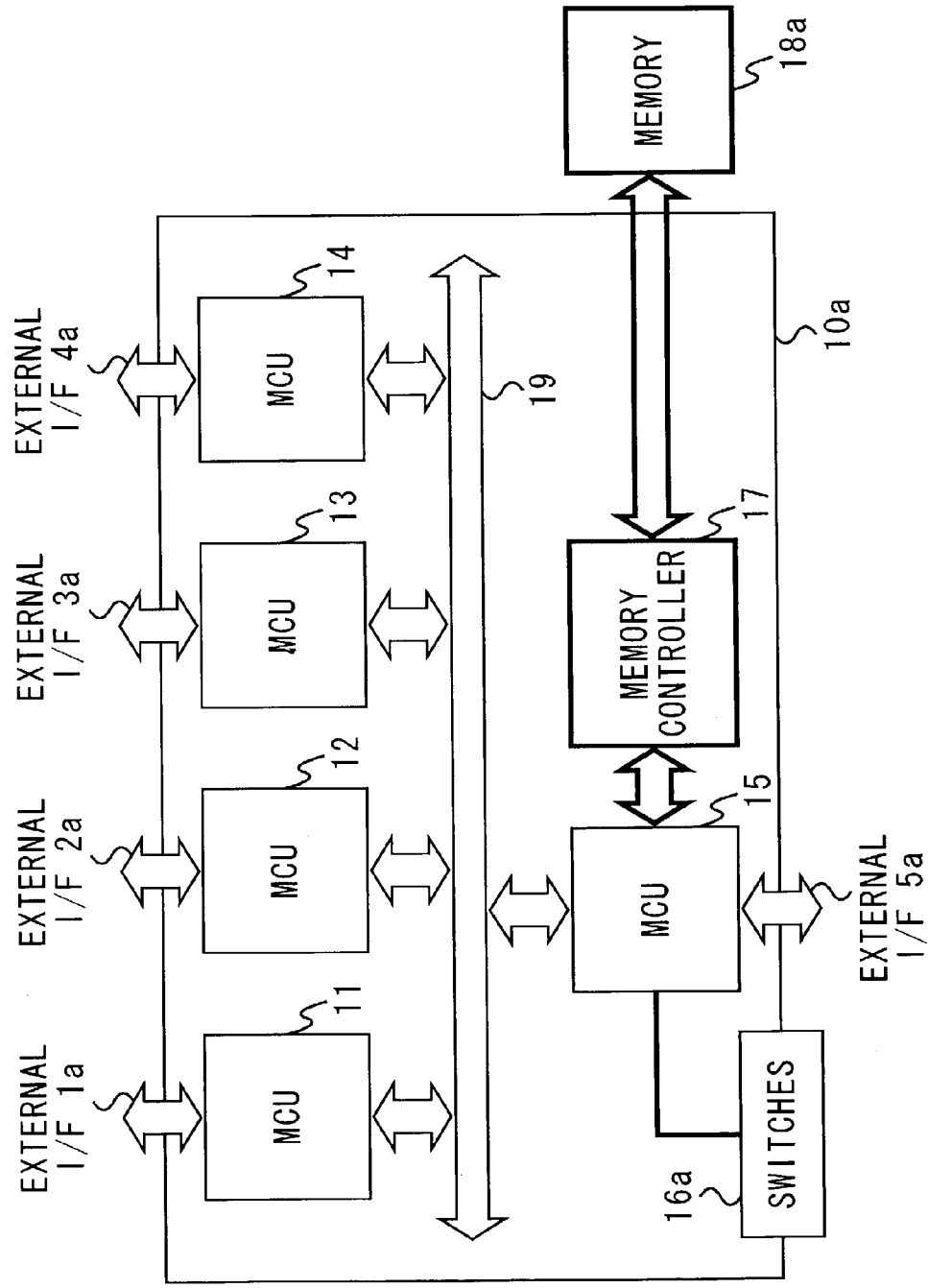
FIG. 12 is a block diagram illustrating the structure of a KVM device 10a according to a second embodiment of the present invention.

FIG. 12 is a block diagram illustrating the structure of a KVM device 10a according to this embodiment.

As can be seen from FIG. 12, the KVM device 10a differs from the KVM device 10 of the first embodiment in that a memory 18a is provided outside the KVM device 10a. The memory 18a of this embodiment is a portable memory such as an SD (Secure Digital) memory card. The KVM device 10a has a slot for accommodating the memory 18a.

In accordance with this embodiment, the portable memory 18a enables an operator to store firmware using any electronic device. Accordingly, an operator can update firmware using a desired information processing apparatus in any desired place. Thus, firmware updating and storing can be performed more readily. Further, a management function for the firmware registered in the memory 18 can be incorporated into an information processing apparatus, so that the stored firmware can be well managed by the information processing apparatus.

The other parts of the structure and operations according to this embodiment are the same as those in the first embodiment, and, therefore, explanation for them is omitted herein.

THIRD EMBODIMENT

In the following, yet another example of a KVM device will be described in detail as a third embodiment of the present invention, with reference to a drawing.

Figure 13:
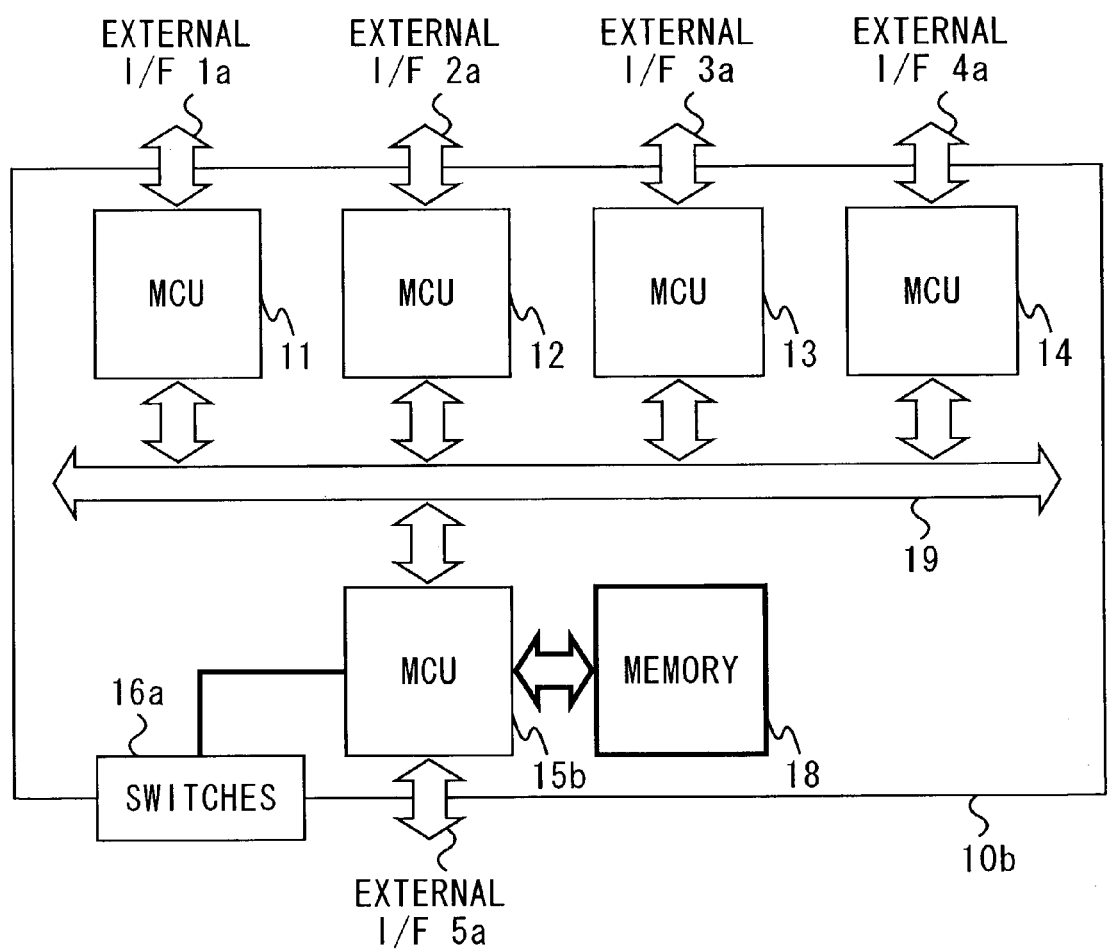
FIG. 13 is a block diagram illustrating the structure of a KVM device 10b according to a third embodiment of the present invention.

FIG. 13 is a block diagram illustrating the structure of a KVM device 10b according to this embodiment.

As can be seen from FIG. 13, the KVM device 10b of this embodiment differs from the KVM device 10 of the first embodiment in that the memory controller 17 is eliminated. In this structure, an MCU 15b of this embodiment controls read and write operations to be performed on the memory 18.

Since the chip structure of the memory controller 17 is eliminated, the KVM device 10b is smaller in size than the KVM device 10.

The other parts of the structure and operations according to this embodiment are the same as those in the first embodiment, and, therefore, explanation for them is omitted herein.

FOURTH EMBODIMENT

In the following, yet another example of a KVM device will be described in detail as a fourth embodiment of the present invention, with reference to a drawing.

Figure 14:
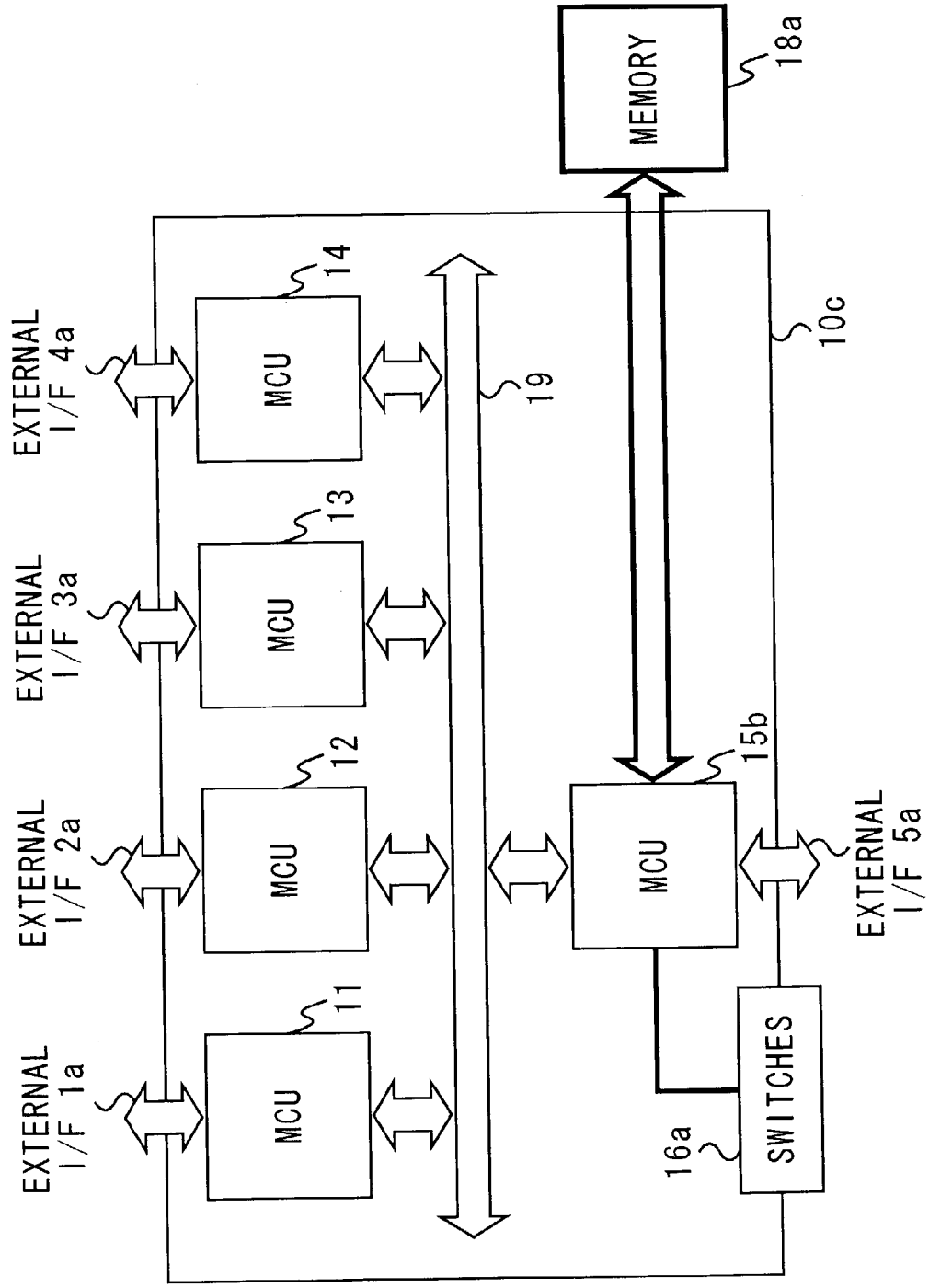
FIG. 14 is a block diagram illustrating the structure of a KVM device 10c according to a fourth embodiment of the present invention.

FIG. 14 is a block diagram illustrating the structure of a KVM device 10c according to this embodiment.

As can be seen from FIG. 14, the KVM device 10c of this embodiment differs from the KVM device 10 of the first embodiment in that the memory controller 17 is eliminated, and that the memory 18a is provided outside the KVM device 10c.

In this structure, the MCU 15b of this embodiment controls read and write operations to be performed on the memory 18a, and the memory 18a is a portable memory of the same type as that of the second embodiment. Also in the same fashion as in the second embodiment, the KVM device 10c has a slot for accommodating the memory 18a.

In accordance with this embodiment, the portable memory 18a enables an operator to store firmware using any electronic device. Accordingly, an operator can update firmware using a desired information processing apparatus in any desired place. Thus, firmware updating and storing can be performed more readily. Further, a management function for the firmware registered in the memory 18a can be incorporated into an information processing apparatus, so that the stored firmware can be well managed by the information processing apparatus. Furthermore, since the chip structure of the memory controller 17 is eliminated, the KVM device 10c is smaller in size than the KVM device 10.

The other parts of the structure and operations according to this embodiment are the same as those in the first embodiment, and, therefore, explanation for them is omitted herein.

FIFTH EMBODIMENT

In the following, yet another example of a KVM device will be described in detail as a fifth embodiment of the present invention, with reference to drawings.

Figure 15:
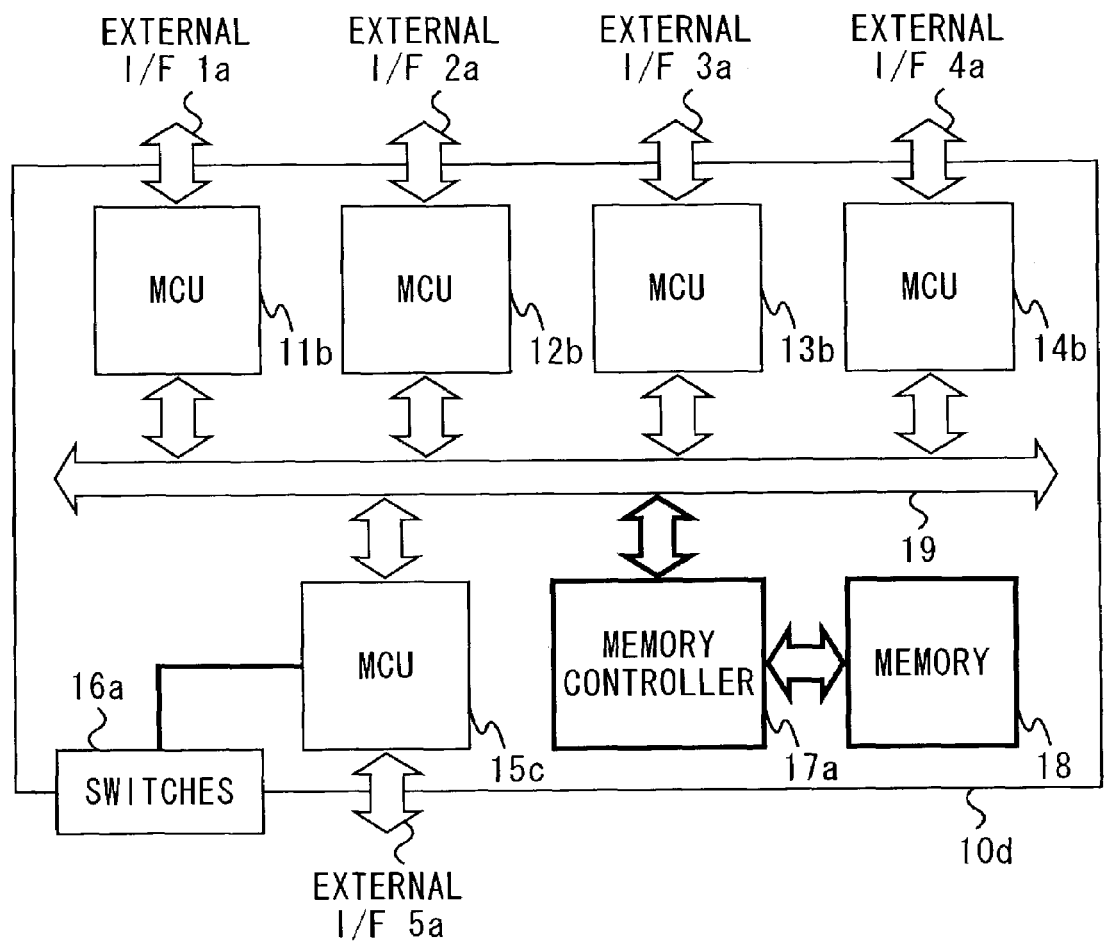
FIG. 15 is a block diagram illustrating the structure of a KVM device 10d according to a fifth embodiment of the present invention.

FIG. 15 is a block diagram illustrating the structure of a KVM device 10d according to this embodiment.

As can be seen from FIG. 15, the KVM device 10d of this embodiment differs from the KVM device 10 of the first embodiment in that a memory controller 17a is connected to the internal bus 19.

As the memory controller 17a is connected to the internal bus 19, all the MCUs 11b through 14b and 15c mounted to the KVM device 10d can have access to the memory 18 via the memory controller 17a. In this structure, each of the MCUs 11b through 14b and 15c can read the firmware directly from the memory unit, which consists of the memory controller 17a and the memory 18 in this embodiment. The access right to the memory 18 can be managed by the MCU 15c. Alternatively, if a plurality of MCUs simultaneously request for access to the memory 18, the internal bus 19 can arbitrate the requests.

Figure 16:
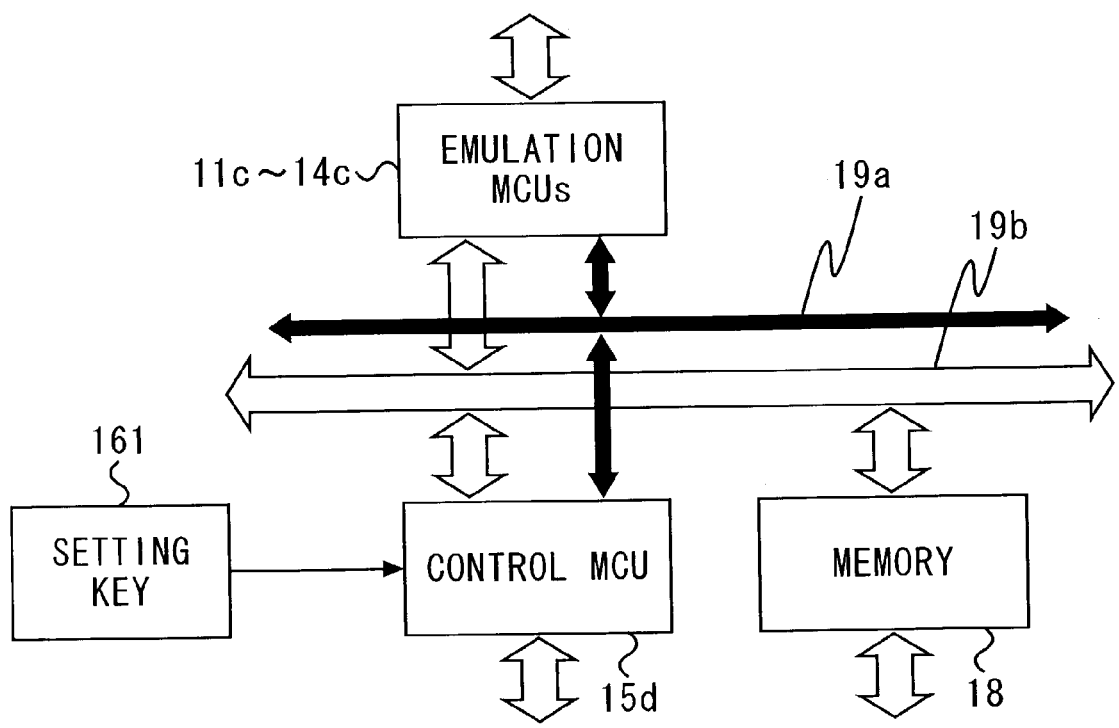
FIG. 16 is a block diagram illustrating the structure of the KVM device 10d in an operation to update the firmware installed in the emulation MCUs 11c through 14c in accordance with the fifth embodiment of the present invention.
Figure 17:
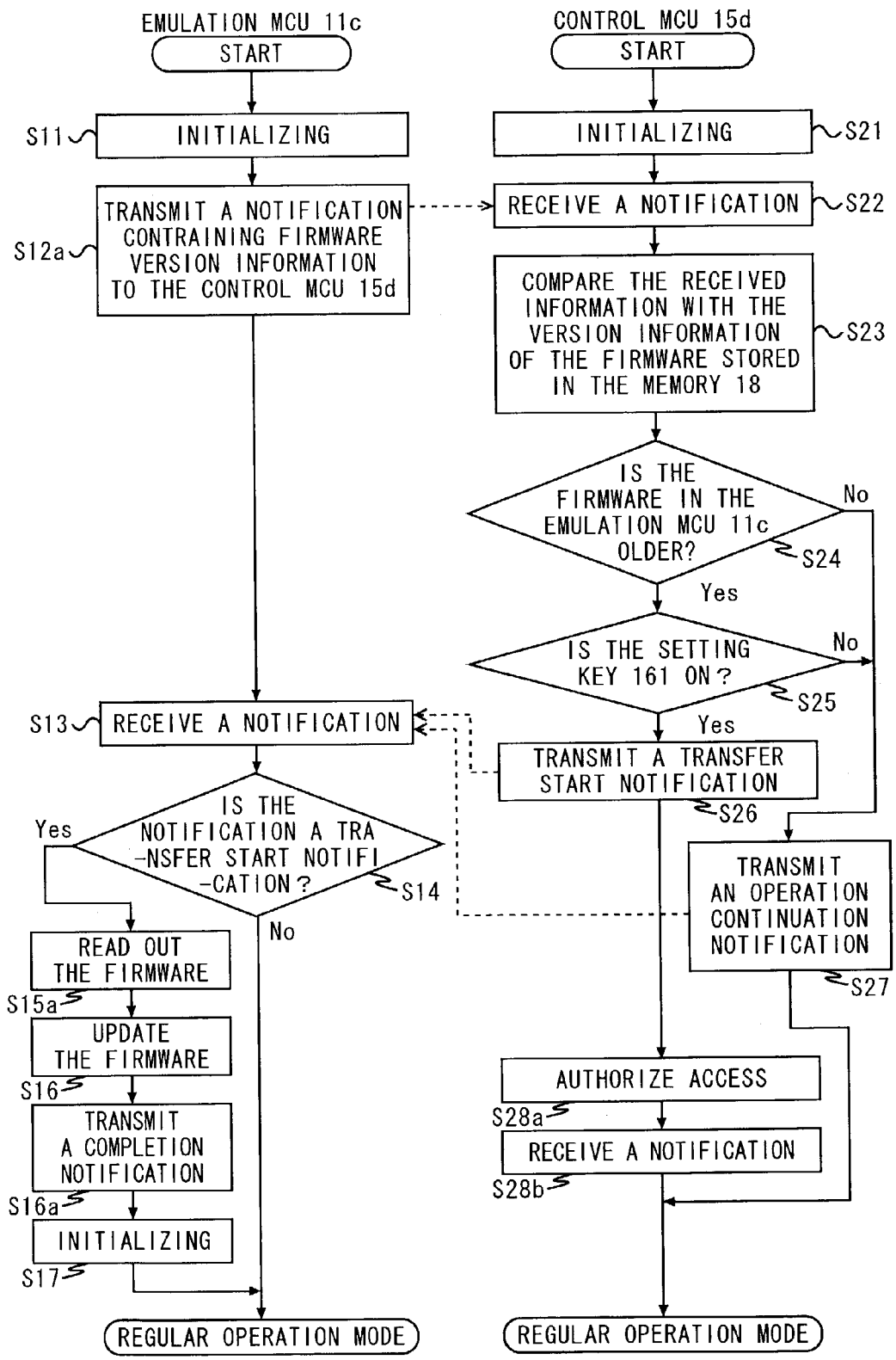
FIG. 17 is a flowchart of an operation to update the firmware installed in the emulation MCUs 11c through 14c in accordance with the fifth embodiment of the present invention.

Referring now to FIGS. 16 and 17, the procedures for updating the firmware installed in the MCUs 11b through 14b and 15c will be described in detail with respect to a structure in which all the MCUs 11b through 14b and 15c can have direct access to the memory 18 via the internal bus 19.

FIG. 16 is a block diagram illustrating the structure of the KVM device 10d. In this figure, the memory controller 17a is not shown, the MCU 15c is shown as a control MCU 15d, and the MCUs 11b through 14b are shown as emulation MCUs 11c through 14c, for ease of explanation.

FIG. 17 is a flowchart of an operation of updating the firmware in the MCU 11c through 14c of the KVM device 10d.

Referring to FIG. 16, the KVM device 10d according to this embodiment has the control MCU 15d to be connected to the external interface 5a, and the emulation MCUs 11c through 14c to be connected to the external interface 1a through 4a, with the control MCU 15d and the emulation MCUs 11c through 14c being communicative with one another via a control bus 19a. The setting key 161 is connected to the control MCU 15d. This setting key 161 is the same as that of the first embodiment, and is one of the switches 16a. Accordingly, an operator can freely operate the setting key 161 from the outside of the housing.

The memory 18 is connected to the control MCU 15d and the emulation MCUs 11c through 14c via a memory bus 19b. Accordingly, the memory space defined by the memory 18 is shared by the control MCU 15d and the emulation MCUs 11c through 14c via the memory bus 19b. Each of the control MCU 15d and the emulation MCUs 11c through 14c individually accesses this memory space, under the arbitration control of the control MCU 15d. In doing so, the control MCU 15d and the emulation MCUs 11c through 14c each perform read and write directly on the firmware stored in the memory 18. Although not shown in FIG. 16, there exists the memory controller 17a between the memory bus 19b and the memory 18, and read and write operations to be performed on the memory 18 are controlled by the memory controller 17a.

In the above structure, the control MCU 15d determines whether the setting key 161 has been pressed or held in a pressed state at the start of an operation, in the same manner as in the first embodiment. If the pressing or the pressed state is detected, the control MCU 15d and the emulation MCUs 11c through 14c move on to an operation mode in which the firmware can be updated. If the pressing or the pressed state is not detected, the control MCU 15d and the emulation MCUs 11c through 14c enter a regular operation mode to realize the function of emulating the KVM. In the following, these procedures will be described in detail, with reference to FIG. 17. It should be noted that explanation will be made with respect to the emulation MCU 11c in FIG. 17, but the same operation is of course to be performed for the other emulation MCUs 12c through 14c.

Referring to FIG. 17, after the start of an operation, the control MCU 15d and the emulation MCU 11c perform an initializing operation to start the preparation for a main operation in steps S11 and S21. In the initializing operation, the control MCU 15d recognizes the model and type of the KVM connected thereto, and notifies the emulation MCU 11c of the recognized model and type.

The control MCU 15d then receives the version information of the incorporated firmware from the emulation MCU 11c in step S22. The version information includes the information as to the recognized KVM and the corresponding firmware, and is transmitted to the control MCU 15*d*. Meanwhile, after the initializing operation, the emulation MCU 11*c* transmits the version information of the firmware incorporated therein to the control MCU 15*d* in step S12*a*.

After receiving the version information of the firmware incorporated into the emulation MCU 11*c*, the control MCU 15*d* spots the version information of the corresponding firmware stored in the memory 18, and compares it with the received version information in step S23. If the version of the firmware stored in the emulation MCU 11*c* is older ("YES" in step S24), the control MCU 15*d* determines whether the setting key 161 is ON (having been pressed or held in a pressed state) in step S25. If the setting key 161 is determined not to be ON ("NO" in step S25), the control MCU 15*d* transmits an operation continuation notification to the emulation MCU 11*c* in step S27, so as to enter the regular operation mode. After that, the control MCU 15*d* enters the regular operation mode. Here, the emulation MCU 11*c* operates along the operation flow described later, but basically moves straight on to the regular operation mode after the initializing operation.

If the setting key 161 is determined to be ON ("YES" in step S25), the control MCU 15*d* transmits a transfer start notification to the emulation MCU 11*c* in step S26, so as to transfer firmware of a new version, i.e., the firmware stored in the memory 18, to the emulation MCU 11*c*. The control MCU 15*d* then authorizes only the emulation MCU 11*c* to access the memory 18 in step S28*a*.

If the version of the firmware stored in the emulated MCU 11*c* is newer or as old as the firmware stored in the memory 18 ("NO" in step S24), the control MCU 15*d* transmits an operation continuation notification to the emulation MCU 11*c* in step S27, so as to enter the regular operation mode. After that, the control MCU 15*d* enters the regular operation mode.

In the above manner, the emulation MCU 11*c* receives a transfer start notification or an operation continuation notification in step S13. The emulation MCU 11*c* then determines whether the received notification is a transfer start notification or an operation continuation notification in step S14. If the received notification is an operation continuation notification ("NO" in step S14), the emulation MCU 11*c* moves straight on to the regular operation mode, and performs an operation specified by the existing firmware.

If the received notification is a transfer start notification ("YES" in step S14), the emulation MCU 11*c*, which is authorized to access the memory 18, reads the corresponding firmware directly from the memory 18 in step S15*a*, and updates the corresponding firmware stored in the non-volatile memory thereof in step S16. When the updating is completed, the emulation MCU 11*c* transmits an update completion notification to the control MCU 15*d* in step S16*a*, and again performs an initializing operation in step S17. The emulation MCU 11*c* then enters the regular operation mode to perform an operation specified by the newly installed firmware. Meanwhile, the control MCU 15*d* receives the update completion notification in step S28*b*, and then enters the regular operation mode.

By the above operation procedures, the firmware installed in the emulation MCU 11*c* can be promptly updated. Any structure can be employed as the structure for transmitting various notifications between the control MCU 15*d* and the emulation MCU 11*c*. For example, an I²C bus that is a serial input/output (I/O) bus may be employed, so that the control MCU 15*d* can read in the register of the emulation MCU 11*c*.

After performing the above operation for all the emulation MCUs (the MCUs 11*c* through 14*c* in the example shown in FIG. 16), the control MCU 15*d* moves on to the regular operation mode in the flowchart of FIG. 17.

The other parts of the structure and operations according to this embodiment are the same as those in the first embodiment, and, therefore, explanation for them is omitted herein.

SIXTH EMBODIMENT

In the following, yet another example of a KVM device will be described in detail as a sixth embodiment of the present invention, with reference to a drawing.

Figure 18:
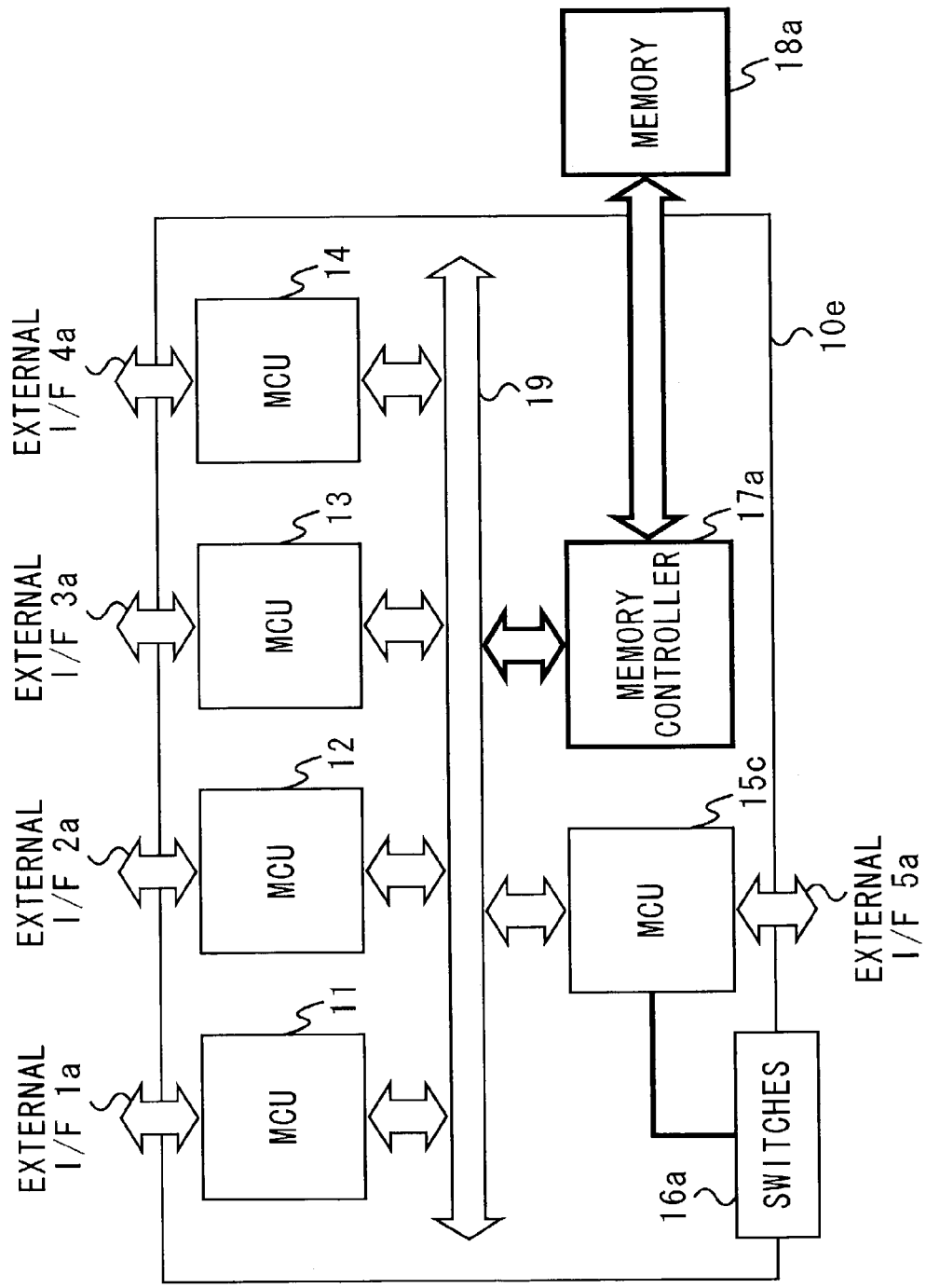
FIG. 18 is a block diagram illustrating the structure of a KVM device 10e according to a sixth embodiment of the present invention.

FIG. 18 is a block diagram illustrating the structure of a KVM device 10*e* according to this embodiment.

As can be seen from FIG. 18, the KVM device 10*e* of this embodiment differs from the KVM device 10*d* of the fifth embodiment in that the memory 18*a* is provided outside the KVM device 10*e*. The memory 18*a* of this embodiment is a portable memory of the same type as that of the second embodiment. Also, the KVM device 10*e* has a slot for accommodating the memory 18*a*.

With the portable memory 18*a*, not only the same effects as the second embodiment but also the same effects as the fifth embodiment can be expected from this embodiment.

The other parts of the structure and operations according to this embodiment are the same as those in the first embodiment and the fifth embodiment, and, therefore, explanation for them is omitted herein.

SEVENTH EMBODIMENT

In the following, yet another example of a KVM device will be described in detail as a seventh embodiment of the present invention, with reference to a drawing.

Figure 19:
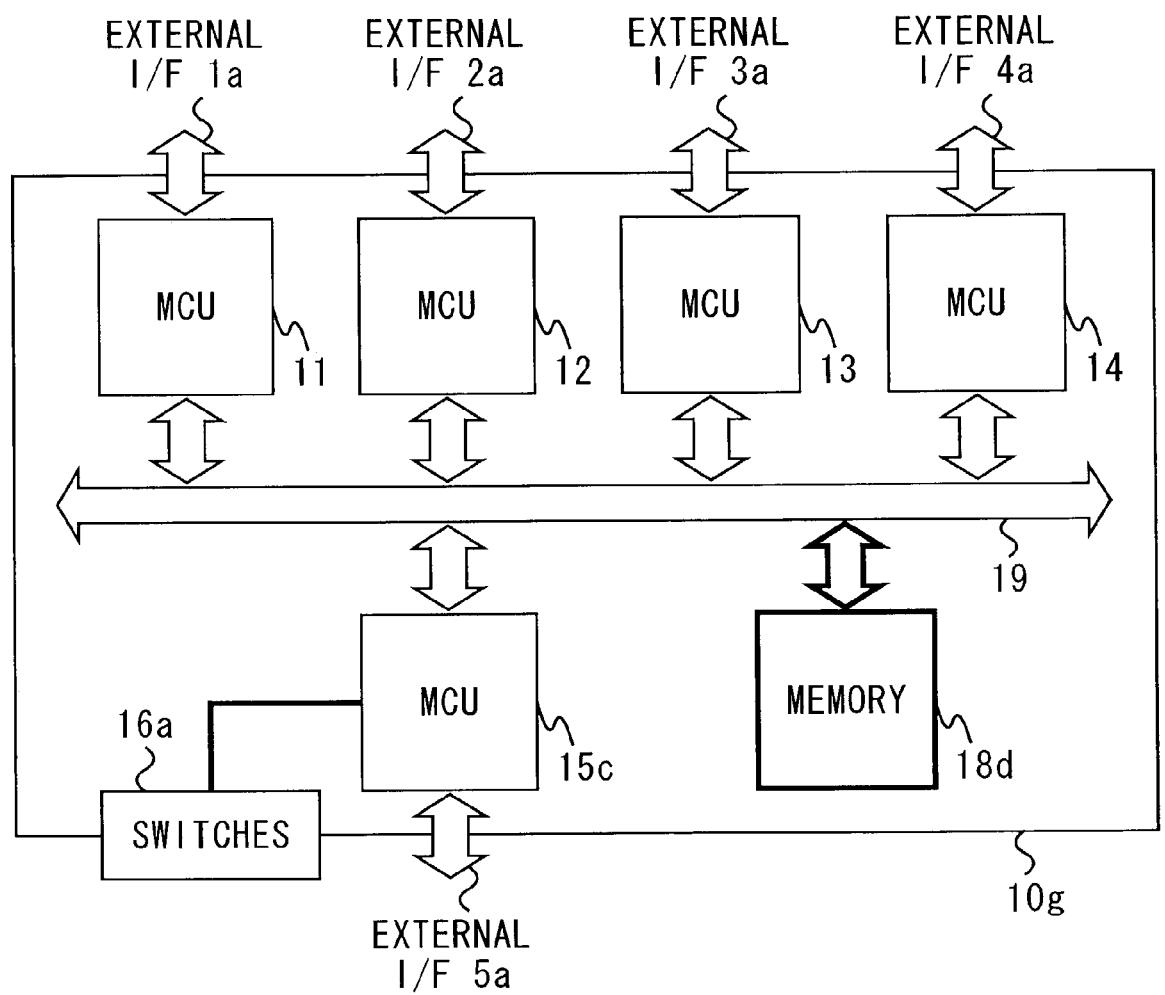
FIG. 19 is a block diagram illustrating the structure of a KVM device 10f according to a seventh embodiment of the present invention.

FIG. 19 is a block diagram illustrating the structure of a KVM device 10*f* according to this embodiment.

As can be seen from FIG. 19, the KVM device 10*f* differs from the KVM device 10*d* of the fifth embodiment in that the memory controller 17*a* is eliminated, and that a memory 18*d* is connected directly to the internal bus 19. With the internal bus 19 being formed by an I²C bus, the memory 18*d* is provided with an I²C bus interface.

As the memory 18*d* provided with an I²C bus interface is connected directly to the internal bus 19, the same effects as the fifth embodiment can be expected. Further, since the memory controller 17*a* is eliminated, the same effects as the third embodiment can be expected.

The other parts of the structure and operations according to this embodiment are the same as those in the first embodiment and the fifth embodiment, and, therefore, explanation for them is omitted herein.

EIGHTH EMBODIMENT

In the following, yet another example of a KVM device will be described in detail as an eighth embodiment of the present invention, with reference to a drawing.

Figure 20:
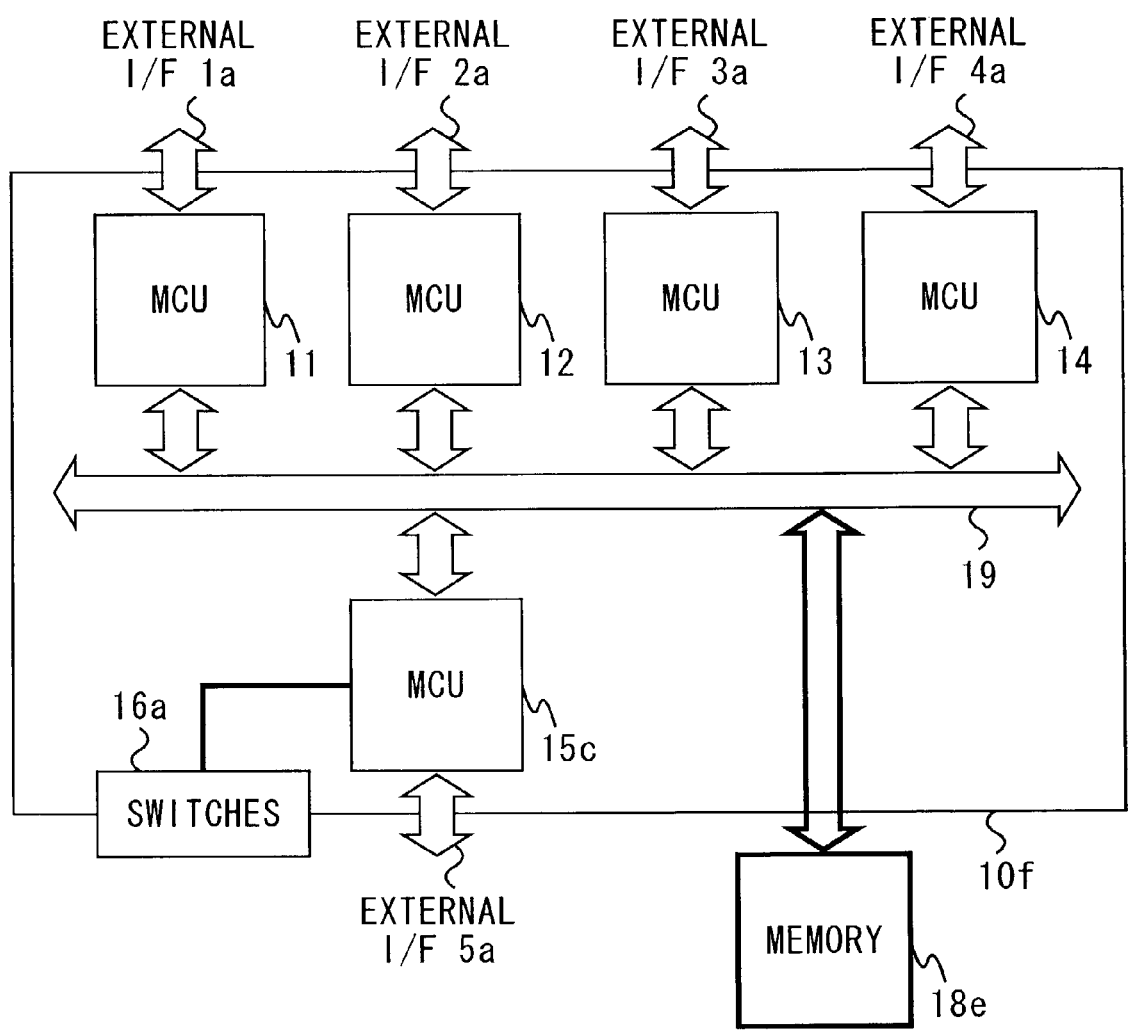
FIG. 20 is a block diagram illustrating the structure of a KVM device 10g according to an eighth embodiment of the present invention.

FIG. 20 is a block diagram illustrating the structure of a KVM device 10*g* according to this embodiment.

As can be seen from FIG. 20, the KVM device 10*g* differs from the KVM device 10*d* of the fifth embodiment in that the memory controller 17*a* is eliminated, and that a memory 18*e* provided outside the device is connected directly to the internal bus 19. The memory 18*e* is a portable memory of the same type as that of the second embodiment, and is provided with an I²C bus interface.

With the portable memory 18*e*, the same effects as the second embodiment can be expected. Also, as the memory

18e is provided with an I²C bus interface and is connected directly to the internal bus 19, the same effects as the fifth embodiment can be expected. Further, since the memory controller 17a is eliminated, the same effects as the third embodiment can be expected.

The other parts of the structure and operations according to this embodiment are the same as those in the first embodiment and the fifth embodiment, and, therefore, explanation for them is omitted herein.

As described so far, the present invention provides an interface device that selects firmware from a memory suitably for a device connected to an external interface, and installs the firmware in a microcontroller (MCU). The memory in the interface device can be rewritten so that the interface device can perform emulation with any type of device. The interface device according to the present invention can cope with any type of device, being able to transform a device unrecognizable to itself into a recognizable device through firmware update. Having this structure, a KVM device according to the present invention can always cope with the latest type of device.

Furthermore, the memory in which firmware is stored may be formed by a portable non-volatile memory, so that the firmware can be more readily managed and updated.

Although a few preferred embodiments of the present invention have been shown and described, it would be appreciated by those skilled in the art that changes may be made in these embodiments without departing from the principles and spirit of the invention, the scope of which is defined in the claims and their equivalents.

The present invention is based on Japanese Patent Application No. 2002-156522 filed on May 29, 2002, the entire disclosure of which is hereby incorporated by reference.

What is claimed is:

1. An interface device communicably connected to computers, comprising:
   a memory storing one or more firmware for emulating peripheral devices including one or more of a keyboard, video, or mouse;
   a peripheral device control microcontroller unit (MCU) connected to the peripheral devices;
   external interfaces to which the computers are connectable; and
   emulation microcontroller units (MCUs) respectively connectable to the computers via the external interfaces, and each executing the firmware emulating the peripheral devices for the computers,
   wherein the peripheral device control MCU checks, according to the memory storing the firmware, for a version of the firmware suitable for any of the peripheral devices that is selectively connected to any of the computers via any of the emulation MCUs and installs the suitable firmware in any of the emulation MCUs connected to any of the computers.

2. The interface device as claimed in claim 1, further comprising a memory controller that controls read and write performed on the memory, wherein:
   the memory controller is connected to one of the MCUs that is connected to the external interface; and
   the memory is provided within the interface device, and is connected to the memory controller.

3. The interface device as claimed in claim 1, further comprising a memory controller that controls read and write performed on the memory, wherein:
   the memory controller is connected to one of the MCUs that is connected to the external interface; and
   the memory is provided outside the interface device, and is connected to the memory controller.

4. The interface device as claimed in claim 3, wherein the memory is a portable memory that can be attached to and detached from the interface device.

5. The interface device as claimed in claim 1, further comprising a memory controller that controls read and write performed on the memory, wherein:
   the peripheral device control MCU authorizes another one of the MCUs to access the memory;
   the memory controller is connected to a bus shared by two or more of the MCUs; and
   the memory is provided within the interface device, and is connected to the memory controller.

6. The interface device as claimed in claim 1, further comprising a memory controller that controls read and write performed on the memory, wherein:
   the peripheral device control MCU authorizes another one of the MCUs to access the memory;
   the memory controller is connected to a bus shared by two or more of the MCUs; and
   the memory is provided outside the interface device, and is connected to the memory controller.

7. The interface device as claimed in claim 1, wherein:
   the peripheral device control MCU authorizes another one of the MCUs to access the memory; and
   the memory is provided within the interface device, includes a bus interface, and is connected to a bus shared by two or more of the MCUs.

8. The interface device as claimed in claim 1, wherein:
   the peripheral device control MCU authorizes another one of the MCUs to access the memory; and
   the memory is provided outside the interface device, includes a bus interface, and is connected to a bus shared by two or more of the MCUs.

9. The interface device as claimed in claim 1, wherein the memory is formed by a non-volatile memory.

10. The interface device as claimed in claim 9, wherein the non-volatile memory is electrically programmable.

11. The interface device as claimed in claim 1, further comprising a setting key that is used for instructing whether to perform a selection of the firmware suitable for the device connected to the external interface,
    wherein, when the setting key instructs to perform the selection, the peripheral device control MCU selects the suitable firmware from the memory.

12. A method of updating firmware in an interface device communicably connected to devices, the method comprising:
    storing one or more firmware for emulating peripheral devices;
    connecting a peripheral device control microcontroller to the peripheral devices;
    providing external interfaces to which the devices are connectable:
    providing emulation microcontroller units (MCUs) respectively connectable to the devices via the external interfaces and each executing the firmware emulating the peripheral devices for the devices;
    recognizing one of devices connected to one of the external interfaces;
    comparing version information of the stored firmware corresponding to the recognized device with version information of the firmware installed in a corresponding emulation MCU; and
    automatically updating the firmware installed in the corresponding emulation MCU, upon connecting the device to said corresponding emulation MCU via a corresponding external interface, with the stored firmware, when the version of the firmware installed in the corresponding emulation MCU is older than the version of the stored firmware.

13. The method according to claim 12, further comprising;

detecting an update of the stored firmware;

comparing version information of the updated stored firmware with version information of the firmware installed in the emulation MCU;

automatically updating the firmware installed in the corresponding emulation MCU, upon connecting the device to said corresponding emulation MCU via the external interface, with the updated stored firmware, when the version of the firmware installed in the corresponding emulation MCU is older than the version of the updated stored firmware.

14. The method as claimed in claim 12, wherein the peripheral control MCU reads the firmware and transmits the firmware to the corresponding emulation MCU to be updated, and the corresponding emulation MCU to be updated installs the transmitted firmware therein in the updating.

15. The method as claimed in claim 12, wherein the peripheral control MCU authorizes the corresponding emulation MCU to be updated to read the stored firmware and install the firmware therein.

16. The method as claimed in claim 12, further comprising inputting an instruction to update the version of the firmware, wherein the comparing is carried out when the instruction to update version of the firmware is input.

17. The interface device as claimed in claim 1, further comprising a switch connected to the peripheral control MCU, wherein the peripheral control MCU determines whether the firmware stored in the memory should be rewritten into one of the emulation MCUs based upon an instruction specified by the switch.

18. The interface device as claimed in claim 1, wherein the memory is provided in the interface device.

19. The interface device as claimed in claim 1, wherein the memory is provided in the interface device.

20. The interface device as claimed in claim 1, wherein the firmware stored in the memory is automatically rewriteable upon connecting the device to the external interface.

* * * * *

UNITED STATES PATENT AND TRADEMARK OFFICE
CERTIFICATE OF CORRECTION

PATENT NO. : 7,480,905 B2
APPLICATION NO. : 10/335862
DATED : January 20, 2009
INVENTOR(S) : Naoyuki Nagao It is certified that error appears in the above-identified patent and that said Letters Patent is hereby corrected as shown below:

Column 13, Line 45, change "interfaces," to --interfaces--.

Column 14, Lines 53-54, change "connectable:" to --connectable;--.

Column 15, Line 5, change "comprising;" to --comprising:--.

Column 16, Line 18, change "provided in" to --connected to--.

Signed and Sealed this

Thirty-first Day of March, 2009

JOHN DOLL
*Acting Director of the United States Patent and Trademark Office*